(12) United States Patent
Jung et al.

(10) Patent No.: US 10,158,807 B2
(45) Date of Patent: Dec. 18, 2018

(54) MOBILE TERMINAL AND METHOD FOR CONTROLLING THE SAME

(71) Applicant: LG ELECTRONICS INC., Seoul (KR)

(72) Inventors: Byungwook Jung, Seoul (KR); Yunhwan Seol, Seoul (KR); Jeeho Hyun, Seoul (KR); Jaekyung Ryu, Seoul (KR); Hyungseok Ji, Seoul (KR); Eunhei Shin, Seoul (KR); Jinsool Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/431,424

(22) Filed: Feb. 13, 2017

(65) Prior Publication Data

US 2018/0027186 A1 Jan. 25, 2018

(30) Foreign Application Priority Data

Jul. 20, 2016 (KR) .......................... 10-2016-0092124

(51) Int. Cl.
*H04N 5/232* (2006.01)
*H04N 5/247* (2006.01)

(52) U.S. Cl.
CPC ..... *H04N 5/23293* (2013.01); *H04N 5/23216* (2013.01); *H04N 5/23296* (2013.01); *H04N 5/247* (2013.01)

(58) Field of Classification Search
CPC .................................................. H04N 5/23293
USPC ...................................................... 348/333.05
See application file for complete search history.

(56) References Cited

U.S. PATENT DOCUMENTS

| | | | |
|---|---|---|---|
| 2004/0027453 A1* | 2/2004 | Hasegawa | G08B 13/19667 348/143 |
| 2015/0016798 A1* | 1/2015 | Fujimatsu | G06K 9/00362 386/223 |

* cited by examiner

*Primary Examiner* — Joel Fosselman
(74) *Attorney, Agent, or Firm* — Lee Hong Degerman Kang & Waimey

(57) ABSTRACT

A mobile terminal includes: a display unit configured to output an image photographed by a camera; at least one camera configured to, based on that a user input for selecting a specific object in the image is applied, track movement of the specific object; and a controller configured to output the specific object in one area within an image frame for a preset time by tracking the movement of the specific object, wherein the controller, based on that a preset user input is applied to the specific object in the image, outputs an object corresponding to each of at least one area within the image frame, and, based on that a user input for selecting one of the objects is applied, outputs the specific object in one area within an image frame corresponding to the selected object.

19 Claims, 24 Drawing Sheets

FIG. 11
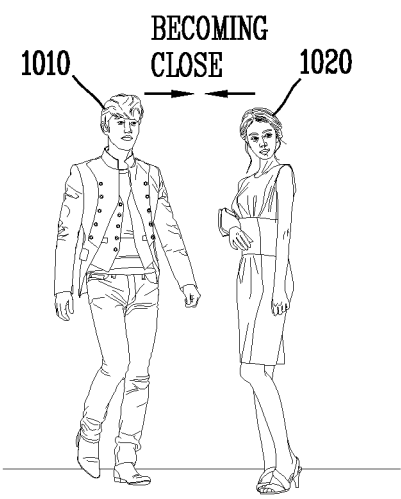
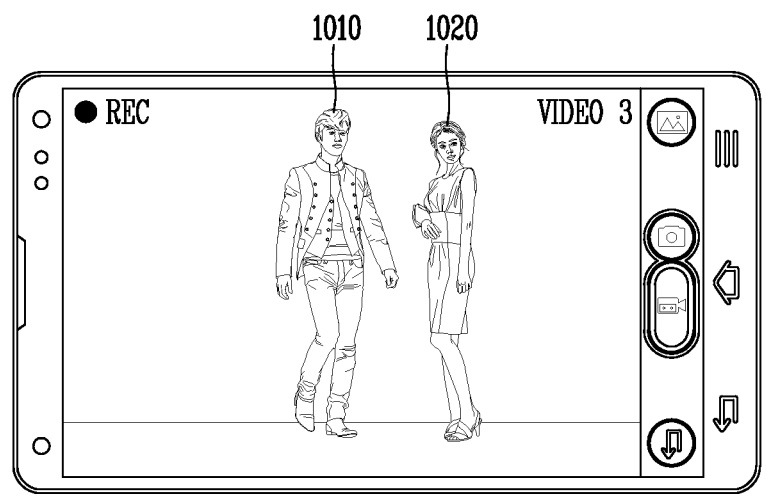

FIG. 12
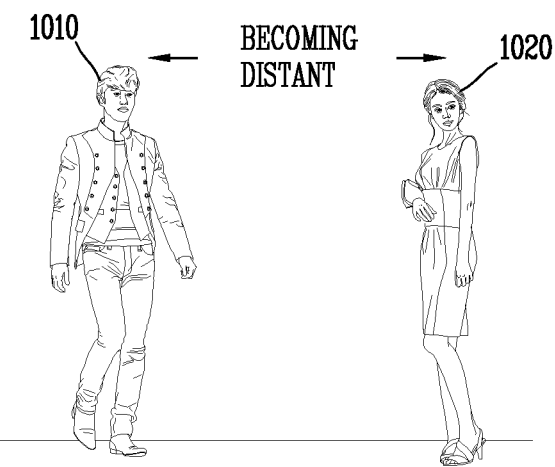
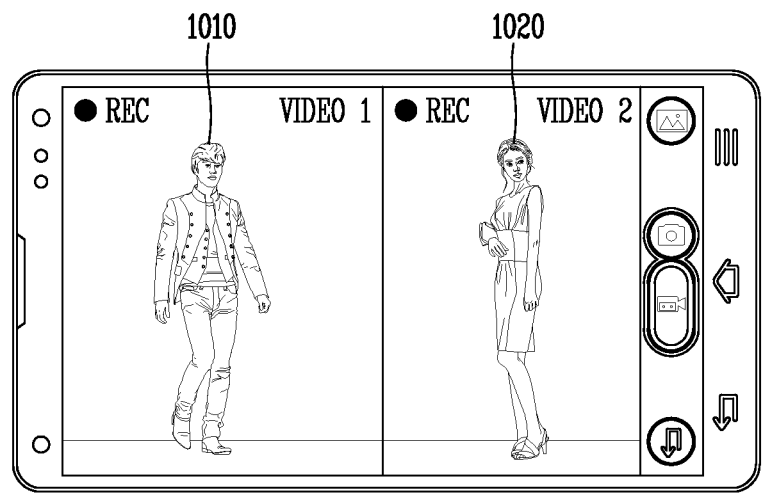

FIG. 17
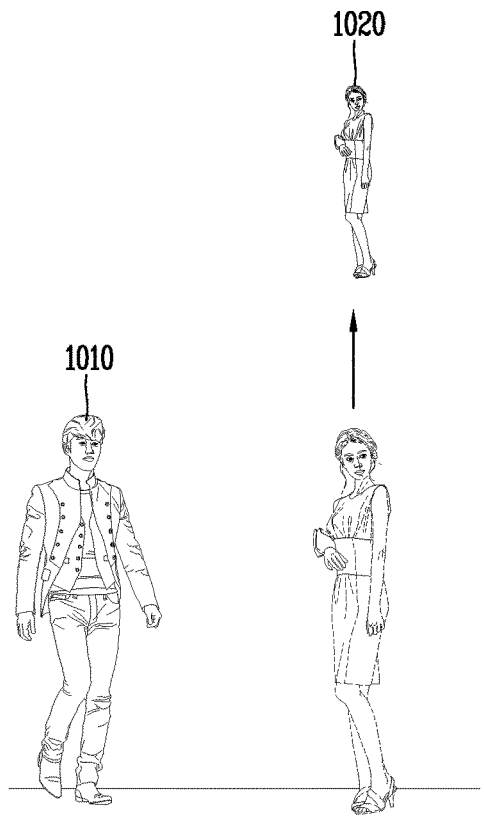
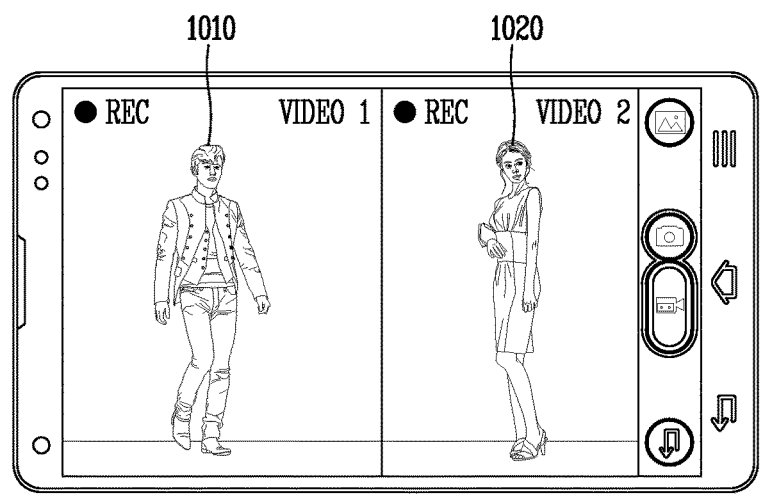

FIG. 18
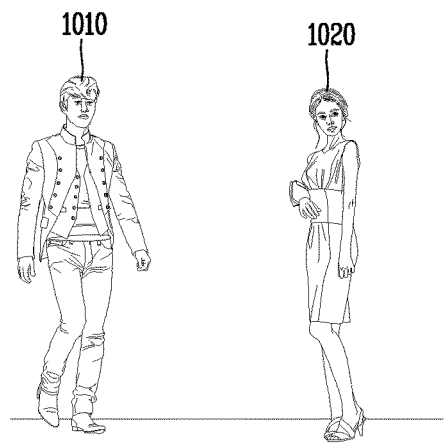
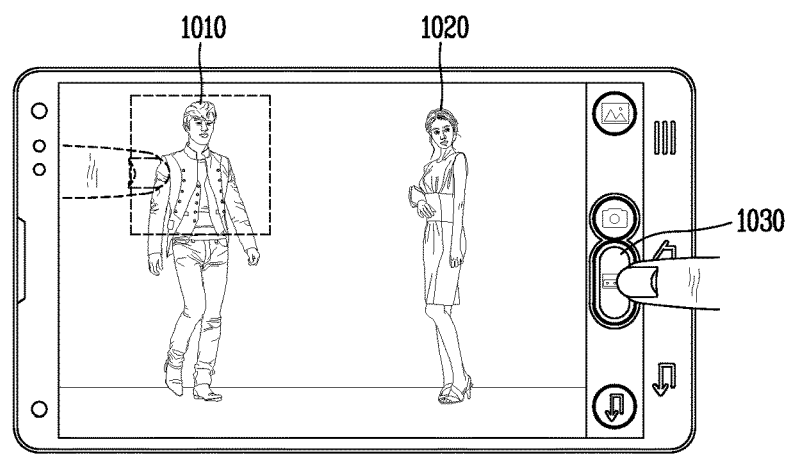
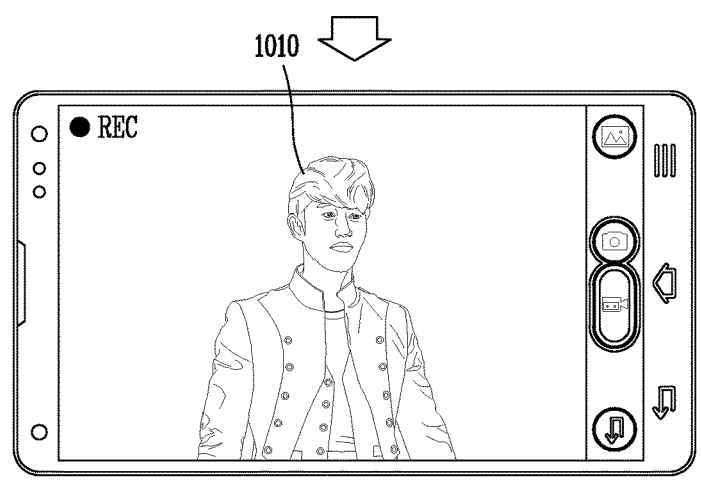

FIG. 19
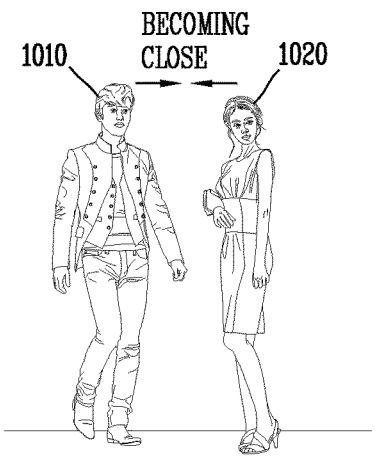
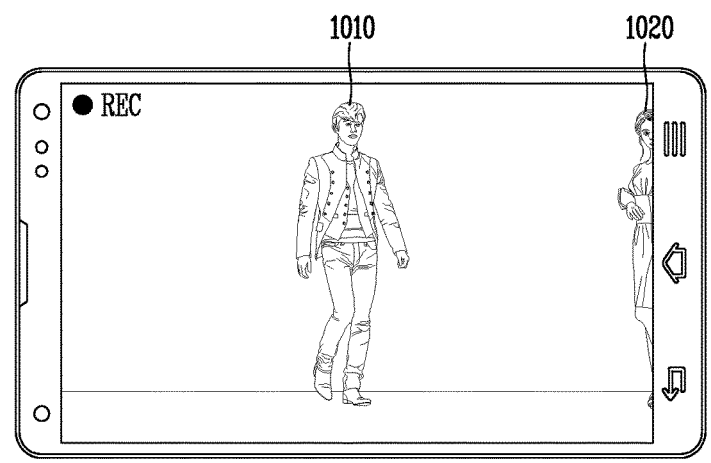
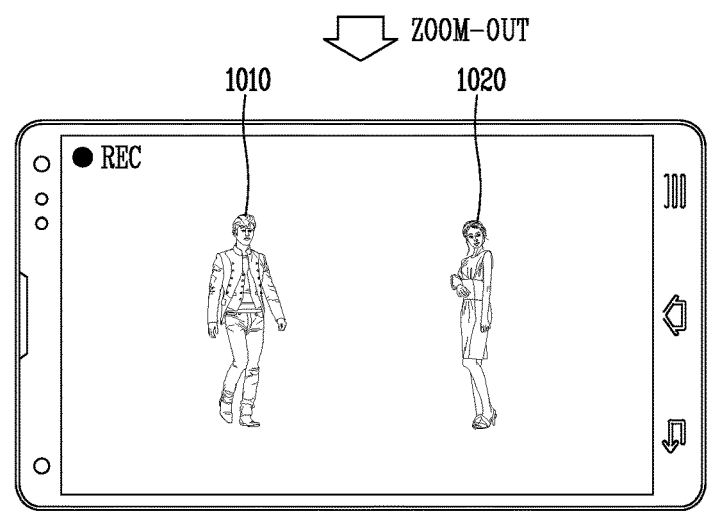

FIG. 22
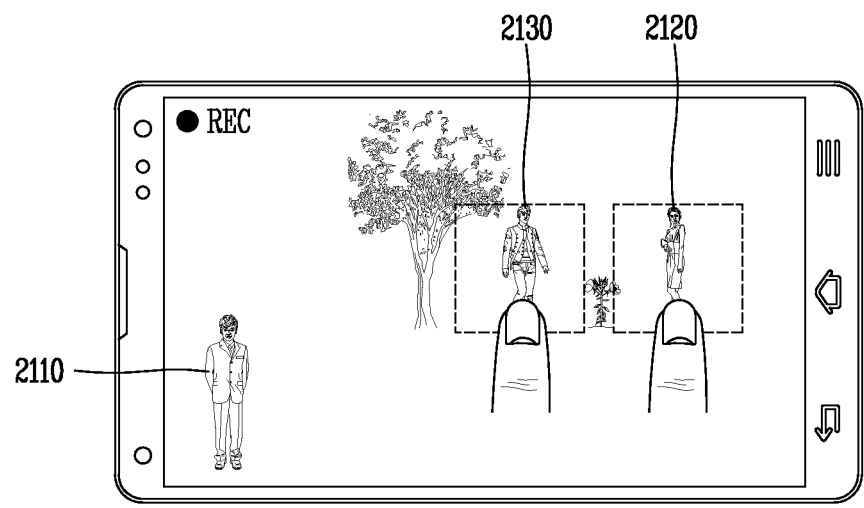
STORE ONE IMAGE
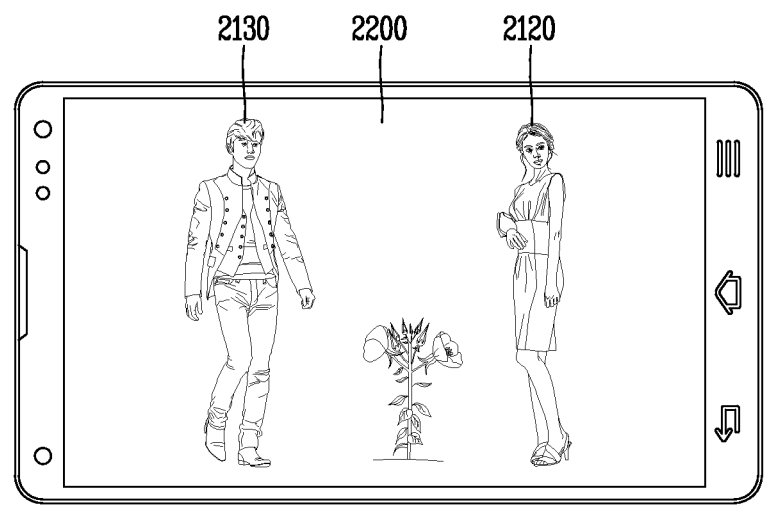

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2016-0092124, filed on Jul. 20, 2016, the contents of which are all hereby incorporated by reference herein in its entirety.

BACKGROUND OF THE INVENTION

1. Field of the Invention

The present disclosure relates to a mobile terminal capable of tracking movement of a specific subject and a method for controlling the mobile terminal.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, movement of a specific subject can be continuously tracked by various object recognition and tacking algorithms. In addition, an image having a viewing angle of 360 degrees can also be implemented by connecting a plurality of cameras.

Accordingly, when a subject is output in various manners such as having a viewing angle of 360 degrees, a necessity to more effectively track movement of the subject is increasing.

SUMMARY OF THE INVENTION

Therefore, an aspect of the detailed description is to provide a mobile terminal that continuously outputs an object of which movement is tacked in one area within an image frame, and a method for controlling the mobile terminal.

To achieve these and other advantages and in accordance with the purpose of this specification, as embodied and broadly described herein, a mobile terminal includes: a display unit configured to output an image photographed by a camera; at least one camera configured to, based on that a user input for selecting a specific object in the image is applied, track movement of the specific object; and a controller configured to output the specific object in one area within an image frame for a preset time by tracking the movement of the specific object, wherein the controller, based on that a preset user input is applied to the specific object in the image, outputs an object corresponding to each of at least one area within the image frame, and, based on that a user input for selecting one of the objects is applied, outputs the specific object in one area within an image frame corresponding to the selected object.

In one exemplary embodiment, the controller, based on that a user input for selecting the specific object in the image is applied, may output a preset image effect to the specific object.

In one exemplary embodiment, the controller, based on that the specific object is output in a preset boundary area within an image frame photographed by a first camera, may control a second camera to track movement of the specific object.

In one exemplary embodiment, the controller, based on that the size of the specific object is decreased to a preset size or less, may end the tracking of the movement of the specific object.

In one exemplary embodiment, the controller, based on that a drag input to one area within the image frame is applied to the specific object in the image, may output the specific object in the one area to which the drag input is applied.

In one exemplary embodiment, the controller, based on that a user input for selecting one area within the image frame is applied, may output the specific object in the selected area for a preset time by tracking movement of the specific object.

In one exemplary embodiment, the controller may store, in a memory, an image in which the specific object is output in one area within the image frame, and output, in a photo album, a thumbnail in which the specific object is output in one area within a thumbnail frame.

In one exemplary embodiment, the controller, based on that a preset user input is applied to the thumbnail, may output an editing window through which the thumbnail is edited.

In one exemplary embodiment, the controller, based on that a preset user input is applied to the editing window, may change an area within the thumbnail frame, in which the specific object is output.

In one exemplary embodiment, the controller, based on that a user input for selecting a plurality of objects in the image and then photographing a moving image is applied, may output a moving image in which each of the plurality of objects is photographed by dividing an area of the display unit.

In one exemplary embodiment, the controller, based on that a distance between the plurality of objects in the moving image is decreased to a preset distance or less, may output a moving image in which the plurality of objects are photographed together in one area of the display unit.

In one exemplary embodiment, the controller, based on that the distance between the plurality of objects in the moving image is increased to the preset distance or more, may again output the moving image in which each of the plurality of objects is photographed by dividing the area of the display unit.

In one exemplary embodiment, the controller, based on that a user input for selecting a plurality of objects in the image and then photographing a moving image is applied, may output a moving image in which the plurality of objects are photographed together in one area of the display unit, and, based on that a distance between the plurality of objects in the moving image is decreased to a preset distance or less or is increased to the preset distance or more, may photograph and output the moving image using a zoom-in or zoom-out technique of a preset degree.

In one exemplary embodiment, the controller, based on that the plurality of objects in the moving image are output with a size difference of a preset degree or more, may photograph and output the moving image using the zoom-out technique of a preset degree.

In one exemplary embodiment, the controller, based on that the plurality of objects in the moving image are output with a size difference of a preset degree or more, may output a moving image in which each of the plurality of objects is photographed by dividing the area of the display unit.

In one exemplary embodiment, the controller, based on that a user input for selecting a specific object in the image and then photographing a moving image is applied, may output a moving image in which the specific object is photographed in one area of the display unit, and, based on that another moving object is output in a preset boundary area within the moving image frame, may photograph and output the moving image using the zoom-out technique of a preset degree.

In one exemplary embodiment, the controller, based on that the specific object in the moving image is partially or entirely covered by the another object and then not again output within a preset time, may end the photographing of the moving image, and, based on that the specific object is again output within the preset time, may output a moving image in which only the specific object is photographed using the zoom-in technique of a preset degree.

In one exemplary embodiment, the controller, based on that a user input for selecting a plurality of objects in a moving image and then photographing an image is applied during photographing of the moving image, may store, in the memory, an image in which the plurality of objects are photographed together or an image in which each of the plurality of objects is photographed, according to a distance between the plurality of objects.

In one exemplary embodiment, the controller, based on that, during photographing of a moving image in which a plurality of objects are selected, a distance between the plurality of objects is decreased to a preset distance or less, may store, in the memory, an image in which the plurality of objects are photographed together at a preset photographing time interval.

To achieve these and other advantages and in accordance with the purpose of this specification, as embodied and broadly described herein, a method for controlling a mobile terminal includes: outputting an image photographed by a camera; based on that a user input for selecting a specific object in the image is applied, tracking movement of the specific object using at least one camera; and outputting the specific object in one area within an image frame for a preset time by tracking the movement of the specific object, wherein the outputting of the specific object in the one area within the image frame for the preset time includes: based on that a preset user input is applied to the specific object in the image, outputting an object corresponding to each of at least one area within the image frame; and based on that a user input for selecting one of the objects is applied, outputting the specific object in one area within an image frame corresponding to the selected object.

Further scope of applicability of the present application will become more apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings:

FIG. 11 is a conceptual diagram illustrating an exemplary embodiment in which, as a distance between the plurality of objects of FIG. 10 is decreased, a moving image in which the plurality of objects are tracked together is output on the entire screen;

FIG. 12 is a conceptual diagram illustrating an exemplary embodiment in which, as a distance between the plurality of objects of FIG. 11 is again increased, moving images in which the respective objects are tacked are again output on divided screens;

FIG. 14 is a conceptual diagram illustrating an exemplary embodiment in which, as a distance between the plurality of objects of FIG. 13 is decreased, a moving image is photographed by automatically performing zoom-in;

FIG. 17 is a conceptual diagram illustrating an exemplary embodiment in which, as the size of at least one of the plurality of objects of FIG. 13 is decreased, a moving image is photographed by automatically performing zoom-in;

FIG. 18 is a conceptual diagram illustrating an exemplary embodiment in which a moving image in which a specific object is tracked is photographed;

FIG. 19 is a conceptual diagram illustrating an exemplary embodiment in which, when another moving object is detected during the photographing of FIG. 18, a moving image is photographed by automatically performing zoom-out;

FIG. 22 is a conceptual diagram illustrating an exemplary embodiment in which an image including a selected object is stored during photographing of a moving image.

DETAILED DESCRIPTION OF EXEMPLARY EMBODIMENTS

Figure 1A:
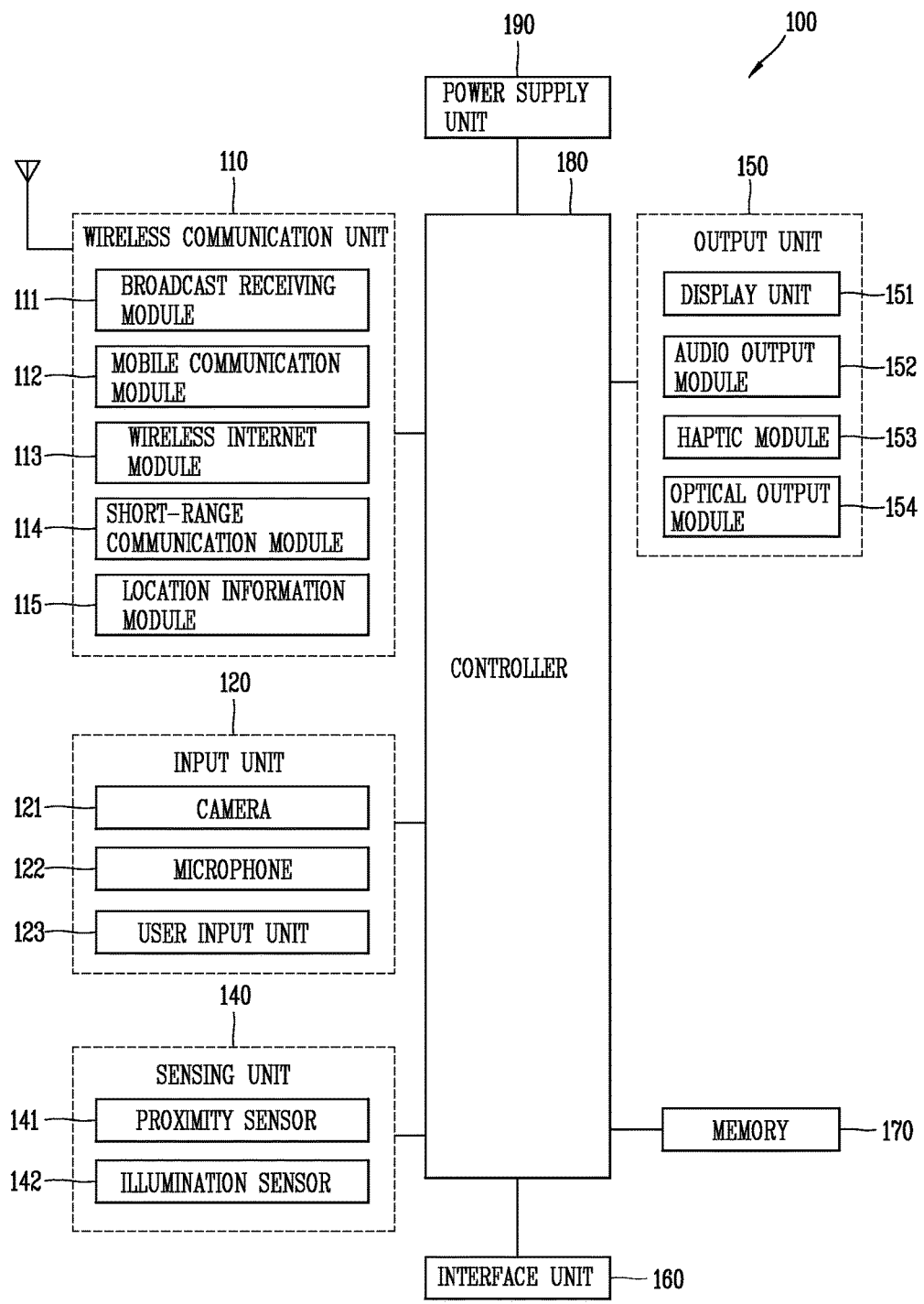
FIG. 1A is a block diagram of a mobile terminal according to an exemplary embodiment.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
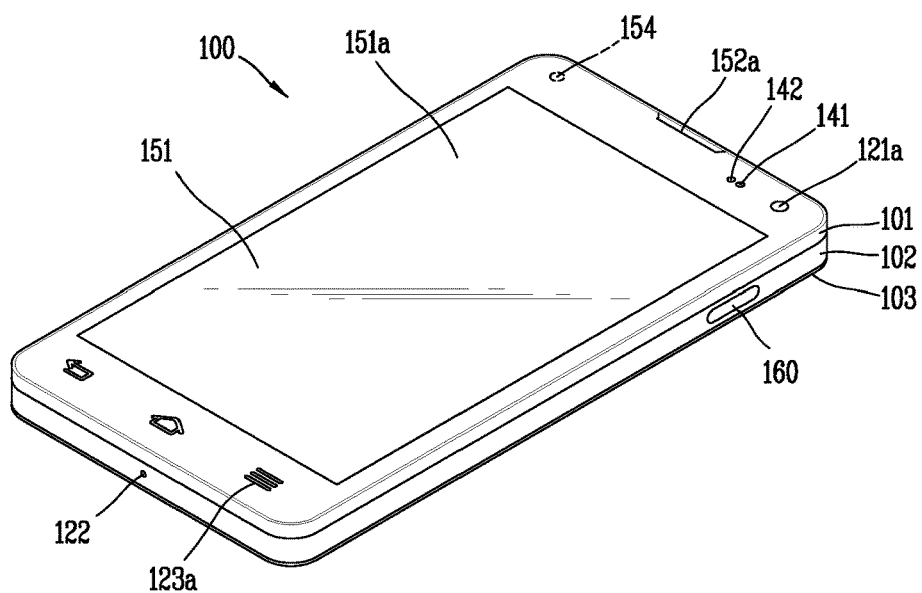
FIGS. 1B and 1C are conceptual diagrams illustrating an example of the mobile terminal, viewed in different directions, according to the exemplary embodiment.
Figure 1C:
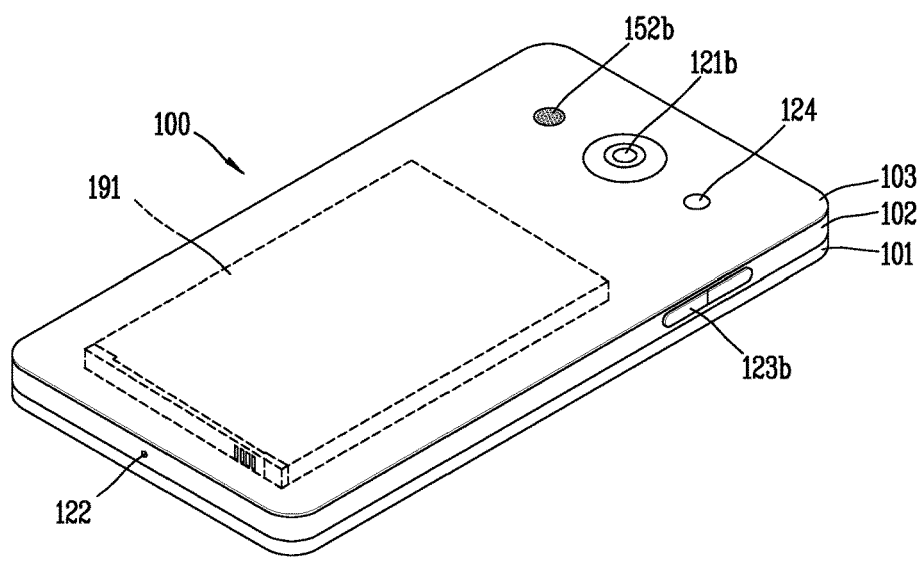

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
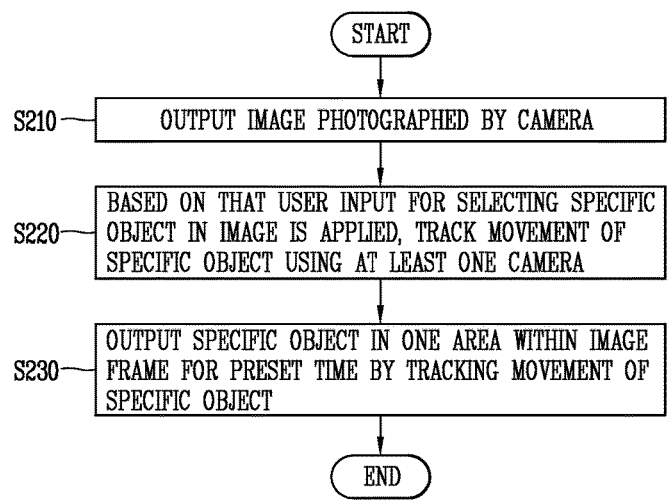
FIG. 2 is a flowchart illustrating a method for controlling the mobile terminal according to the exemplary embodiment.

FIG. 2 is a flowchart illustrating a method for controlling the mobile terminal according to the exemplary embodiment.

Referring to FIG. 2, an image photographed by the camera 121 is output (S210).

As an exemplary embodiment, the image may be a still image or moving image, and may be a preview image viewed before a touch input is applied to a photographing icon.

Subsequently, based on that a user input for selecting a specific object in the image is applied, movement of the specific object is tracked by at least one camera (S220).

The specific object may be a person, thing, or the like, which exists in the image, and various object tracking algorithms may be used to track movement of the specific object.

Next, the specific object is output in one area within an image frame during a preset time by tracking the movement of the specific object (S230).

The image frame may be defined as an area in which an image is output on the display unit 151. In addition, the one area within the image frame may be previously set or may be specified by a user.

As an exemplary embodiment, step S230 may include a step of, based on that a preset user input is applied to a specific object in the image, outputting an object corresponding to each of at least one area within the image frame, and, based on that a user input for selecting one of the objects is applied, outputting the specific object in one area within an image frame corresponding to the selected object.

As another exemplary embodiment, if a touch input is applied to a person in an image, the person may be continuously output in a middle area within an image frame. To this end, movement of the person may be tracked by a plurality of cameras.

Hereinafter, an exemplary embodiment will be described in terms of components.

The display unit 151 may output an image photographed by the camera 121.

Based on that a user input for selecting a specific object in the image is applied, at least one camera 121 may track movement of the specific object.

The controller 180 may output the specific object in one area within an image frame for a preset time by tracking the movement of the specific object.

Also, the controller 180, based on that a preset user input is applied to a specific object in the image, may output an object corresponding to each of at least one area within the image frame, and output the specific object in one area of an image frame corresponding to the selected object.

In an exemplary embodiment, the controller 180, based on that a user input for selecting a specific object in the image is applied, may output a preset image effect to the specific object.

In an exemplary embodiment, the controller 180, based on the specific object is output in a preset boundary area within an image frame photographed by a first camera, may control a second camera to track movement of the specific object.

In an exemplary embodiment, the controller 180, based on that the specific object is decreased by a preset size or less, may end the tracking of the movement of the specific object.

In an exemplary embodiment, the controller 180, based on that a drag input to one area within the image frame is applied to a specific object in the image, may output the specific object in the one area to which the drag input is applied.

In an exemplary embodiment, if a user input for selecting one area within the image frame is applied, the controller 180 may output the specific object in the selected area for a preset time by tracking movement of the specific object.

In an exemplary embodiment, the controller may store, in the memory 170, an image in which the specific object is output in one area within the image frame, and output a thumbnail in which the specific object is output in one area within a thumbnail frame.

In an exemplary embodiment, the controller 180, based on that a preset user input is applied to the thumbnail, may output an editing window through which the thumbnail can be edited.

In an exemplary embodiment, the controller 180, based on that a preset user input is applied to the editing window, may change an area within the thumbnail frame, in which the specific object is output.

In an exemplary embodiment, the controller 180, based on that a user input for selecting a plurality of objects in the image and then photographing a moving image is applied, may output a moving image in which each of the plurality of objects is photographed by dividing the area of the display unit 151.

In an exemplary embodiment, the controller 180, based on that a distance between the plurality of objects in the moving image is decreased to preset distance or less, may output a moving image in which the plurality of objects are photographed together in one area of the display unit 151.

In an exemplary embodiment, the controller 180, based on that the distance between the plurality of objects in the moving image is increased to a preset distance or more, may again output the moving image in which each of the plurality of objects is photographed by dividing the area of the display unit 151.

In an exemplary embodiment, the controller 180, based on that a user input for selecting a plurality of objects in the image and then photographing a moving image is applied, may output a moving image in which the plurality of objects are photographed together in one area of the display unit 151, and, based on that a distance between the plurality of objects in the moving image is decreased to a preset distance or less or increased to a preset distance or more, may photograph and output the moving image using a zoom-in or zoom-out technique.

In an exemplary embodiment, the controller 180, based on that the plurality of objects in the moving image are output with a size difference greater than a preset degree, may photograph and output the moving image using the zoom-out technique of a preset degree.

In an exemplary embodiment, the controller 180, based on that the plurality of objects in the moving image are output with a size difference greater than a preset degree, may output a moving image in which each of the plurality of objects is photographed by dividing the area of the display unit 151.

In an exemplary embodiment, the controller 180, based on that a user input for selecting a specific object in the image and then photographing a moving image is applied, may output a moving image in which the specific object is photographed in on area of the display unit 151, and, based on that another moving object is output in a preset boundary area in the moving image frame, may photograph and output the moving image using the zoom-out technique of a preset degree.

In an exemplary embodiment, the controller 180, based on that the specific object in the moving image is partially or entirely covered by the another object and then not again output within a preset time, may end the photographing of the moving image, and, based on that the specific object in the moving image is again output within the preset time, may output a moving image in which only the specific object is photographed using the zoom-in technique of a preset degree.

In an exemplary embodiment, the controller 180, based on that a user input for selecting a plurality of objects in a moving image during photographing of the moving image and then photographing an image is applied, may store, in the memory 170, an image in which the plurality of objects are photographed together or an image in which each of the plurality of objects is photographed, according to a distance between the plurality of objects.

In an exemplary embodiment, the controller 180, based on that, during photographing of a moving image in which a plurality of objects are selected, a distance between the plurality of objects is decreased to a preset distance or less, may store, in the memory 170, an image in which the plurality of objects are photographed together at a preset photographing time interval.

Meanwhile, the controller 180, based on that a user input for selecting a specific object in the image is applied, may output a preset image effect to the specific object.

That is, by the preset image effect, it may be displayed that the specific object has been selected.

Figure 3:
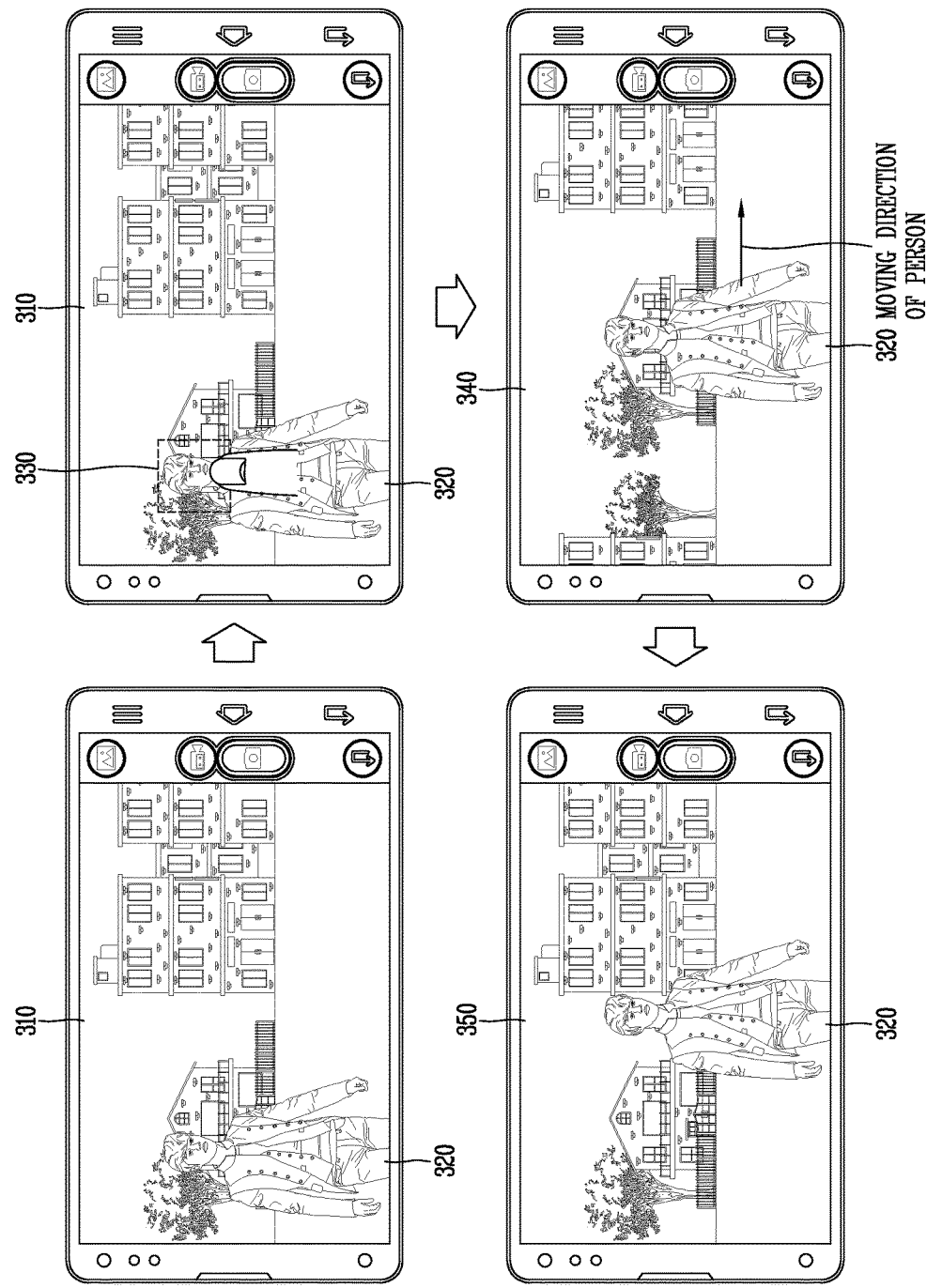
FIG. 3 is a conceptual diagram illustrating an exemplary embodiment in which a tracking object is continuously output in a middle area of a screen.

FIG. 3 is a conceptual diagram illustrating an exemplary embodiment in which a tracking object is continuously output in a middle area of a screen.

Referring to FIG. 3, a preset touch input may be applied to a specific person 320 in a (preview) image 310 photographed in a camera photographing mode. Therefore, an area 330 for displaying that the person 320 has been selected may be arbitrarily displayed.

As an exemplary embodiment, a quadrangular area 330 that includes the person 320 and has an edge indicated by a dotted line may be output. As another exemplary embodiment, the area including the person 320 may be output in various shapes, and a flickering image effect may be output at the edge of the area 330.

As the preset touch input is applied to the person 320, an image 340 or 350 in which the person 320 is output in a middle area of the display unit 151 may be continuously output.

As an exemplary embodiment, as a photographing direction of the camera 12 is moved to the left side, an image 340 in which the person 320 is output in the middle area may be output. After that, the image 340 may be stored in the memory 170.

In addition, by tracking movement of the person 320, the photographing direction of the camera 121 may be changed such that the person 320 is continuously output in the middle area.

As an exemplary embodiment, when the person 320 moves to the right side, the photographing direction of the camera 121 may be changed to the right side along the movement of the person 320. As a result, although the person 320 moves to the right side, an image 350 in which the person 320 is output in the middle area may be again output.

As another exemplary embodiment, when the size of the person 320 output in the image is decreased to a preset degree or less, the tracking of the movement of the person 320 may be ended. As a specific example, when the person 320 in the image is displayed with a very small size as a distance between the person 320 and the camera 121 is decreased, the tracking of the movement of the person 320 may be ended.

Meanwhile, the controller 180, based on that the specific object is output in a preset boundary area within an image frame photographed by the first camera, may control the second camera to track movement of the specific object.

Figure 4:
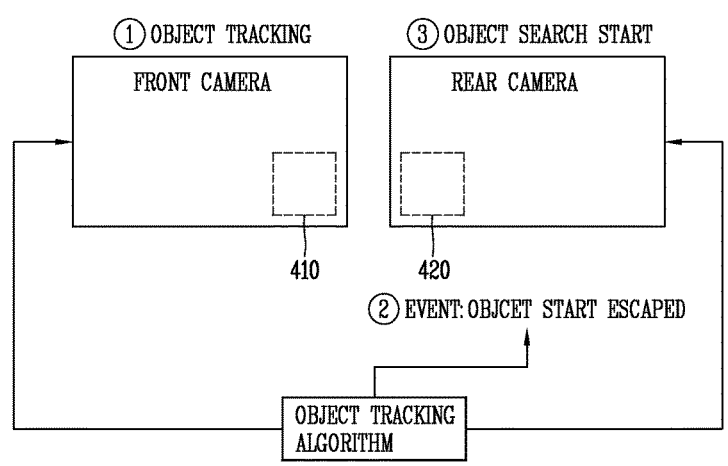
FIG. 4 is a conceptual diagram illustrating an object tracking principle using a plurality of cameras.

FIG. 4 is a conceptual diagram illustrating an object tracking principle using a plurality of cameras.

Referring to FIG. 4, the front camera 121*a* may track movement of a specific object by various object tracking algorithms.

In this case, a specific object may be output in a boundary area 410 of an image frame photographed by the front camera 121*a*. That is, a case where a specific object is captured at a view angle boundary of the front camera 121*a* may be detected as a point of time when the specific object starts escaping from a viewing angle of the front camera 121*a*.

Therefore, tracking of a specific object using the rear camera 121*b* may be started. Specifically, the rear camera 121*b* may detect a specific object by various tracking algorithms and track movement of the specific object. For example, when tracking of a specific object using the rear camera 121*b* is started, the specific object may be output in a boundary area 420 of an image frame photographed by the rear camera 121*b*.

In order to track a specific object as described above, the mobile terminal may be linked with an external photographing device capable of photographing a space with a wide viewing angle. For example, the mobile terminal may receive an image photographed by an external photographing device capable of photographing a 360-degree image. The photographing device may implement a viewing angle of 360 degrees by connecting a plurality of cameras.

As another exemplary embodiment, the viewing angle of 360 degrees may be implemented by the front camera 121*a* and the rear camera 121*b*. To this end, a super wide angle lens having a viewing angle of 180 degrees or more may be provided in each of the front camera 121*a* and the rear camera 121*b*.

Specifically, a fisheye lens that is a super wide angle lens having an image pickup angle of 180 degrees or more may be provided in each of the front camera 121*a* and the rear camera 121*b*. That is, a picture and a moving image are photographed by two fisheye lenses having a viewing angle of 180 degrees or more, and two contents created by the respective lenses are spherically synthesized, thereby creating a 360-degree content (image, moving image, etc.).

An embodiment related to this will be described with reference to FIG. 3.

Referring back to FIG. 3, the images 310, 340, and 350 photographed in the camera photographing mode may be images having viewing angles.

Specifically, if a preset touch input is applied to the specific person 320 in the image 310 having a viewing angle of 360 degrees, a quadrangular area 330 that includes the person 320 and has an edge indicated by a dotted line may be output. In this case, the area including the person 320 may be output in various shapes, and a flickering image effect may be output at the edge of the area 330.

As the preset touch input is applied to the person 320, a 360-degree image 340 or 350 in which the person 320 is output in a middle area of the display unit 151 may be continuously output.

As an exemplary embodiment, by tracking movement of the person, a 360-degree image 350 in which the person 320 is output in the middle area even when the person 320 moves to the right side may be output. In addition, the images 340 and 350 may be stored in the memory 170.

Meanwhile, the controller 180, based on that a preset user input is applied to a specific object in the image, may output an object corresponding to each of at least one area within the image frame, and, based on that a user input for selecting one of the objects is applied, may output the specific object in one area within an image frame corresponding to the selected object.

In addition, the controller 180, based on that the specific object is decreased to a preset size or less, may end the tracking of the movement of the specific object.

Figure 5:
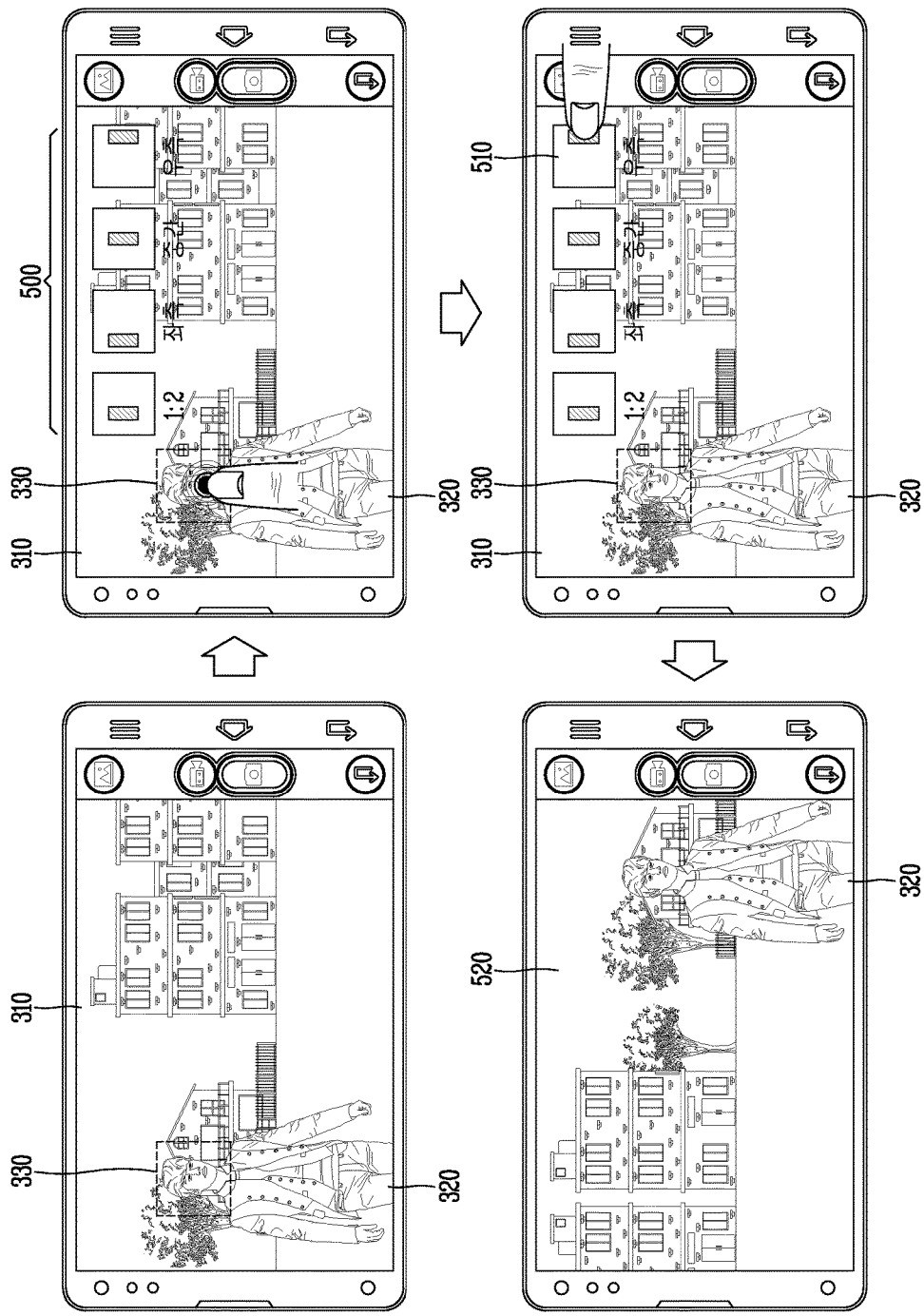
FIG. 5 is a conceptual diagram illustrating an exemplary embodiment in which an area in which a tracking object is to be output is recommended.

FIG. 5 is a conceptual diagram illustrating an exemplary embodiment in which an area in which a tracking object is to be output is recommended.

Referring to FIG. 5, as illustrated in FIG. 3, a preset touch input may be applied to a specific person 320 in a (preview) image 310 photographed in a camera photographing mode. Therefore, an area 330 for displaying that the person 320 has been selected may be arbitrarily displayed.

As an exemplary embodiment, a quadrangular area 330 that includes the person 320 and has an edge indicated by a dotted line may be output. As another exemplary embodiment, the area including the person 320 may be output in various shapes, and a flickering image effect may be output at the edge of the area 330.

If a preset touch input is again applied to the person 320, objects 500 that recommend positions at which a specific object is to be output in an image frame may be output.

As an exemplary embodiment, the touch input applied to the person 320 may be set in various manners such as a long touch, a double touch, and a force touch. In addition, icons 510 corresponding to specific areas in the image frame may be output in a picture in picture (PIP) manner.

As a specific embodiment, if a long touch input is applied to the person 320, PIP icons 510 corresponding to 1:2, left, middle, and right areas in the image frame may be output.

Subsequently, if a preset touch input is applied to a PIP icon 510 corresponding to the right area, an image 520 in which the person 320 is output at the right side in the image frame may be continuously output. That is, by tracking movement of the person 320, an image in which the person 320 is output in the right area may be continuously output even when the person 320 moves. In addition, the images may be stored in the memory 170.

As another exemplary embodiment, when the size of the person 320 output in the image is decreased to a preset degree or less, the tracking of the movement of the person 320 may be ended. As a specific example, when the person 320 in the image is displayed with a very small size as a distance between the person 320 and the camera 121 is decreased, the tracking of the movement of the person 320 may be ended.

Meanwhile, the controller 180, based on that a drag input to one area within the image frame is applied to a specific object in the image, may output the specific object in the one area to which the drag input is applied.

Figure 6:
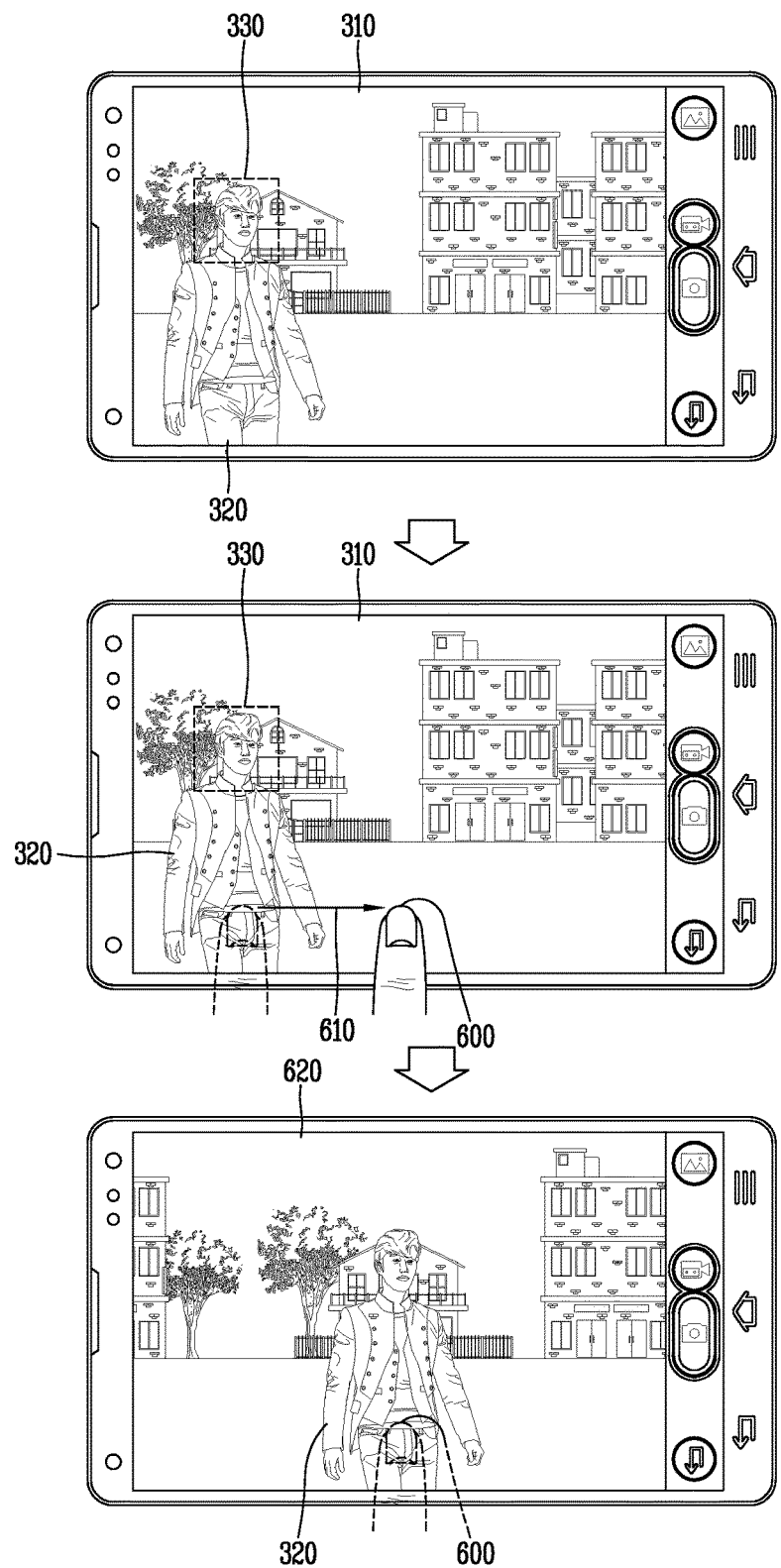
FIG. 6 is a conceptual diagram illustrating an exemplary embodiment in which a tracking object is continuously output in an area to which a drag input is applied.

FIG. 6 is a conceptual diagram illustrating an exemplary embodiment in which a tracking object is continuously output in an area to which a drag input is applied.

Referring to FIG. 6, as illustrated in FIG. 3, a preset touch input may be applied to a specific person 320 in a (preview) image 310 photographed in a camera photographing mode. Therefore, an area 330 for displaying that the person 320 has been selected may be arbitrarily displayed.

As an exemplary embodiment, a quadrangular area 330 that includes the person 320 and has an edge indicated by a dotted line may be output. As another exemplary embodiment, the area including the person 320 may be output in various shapes, and a flickering image effect may be output at the edge of the area 330.

If a drag input 610 to a specific area within an image frame is applied to the person 320, an image 620 in which the person 320 is output in the specific area 600 may be continuously output. That is, by tracking movement of the person 320, the image in which the person 320 is output in the specific area 600 may be continuously output even when the person 320 moves. In addition, the images may be stored in the memory 170.

As another exemplary embodiment, when the size of the person 320 output in the image is decreased to a preset degree or less, the tracking of the movement of the person 320 may be ended. As a specific example, when the person 320 in the image is displayed with a very small size as a distance between the person 320 and the camera 121 is decreased, the tracking of the movement of the person 320 may be ended.

Meanwhile, if a user input for selecting one area of the image frame is applied, the controller 180 may output the specific object in the selected area for a preset time by tracking movement of the specific object.

Figure 7:
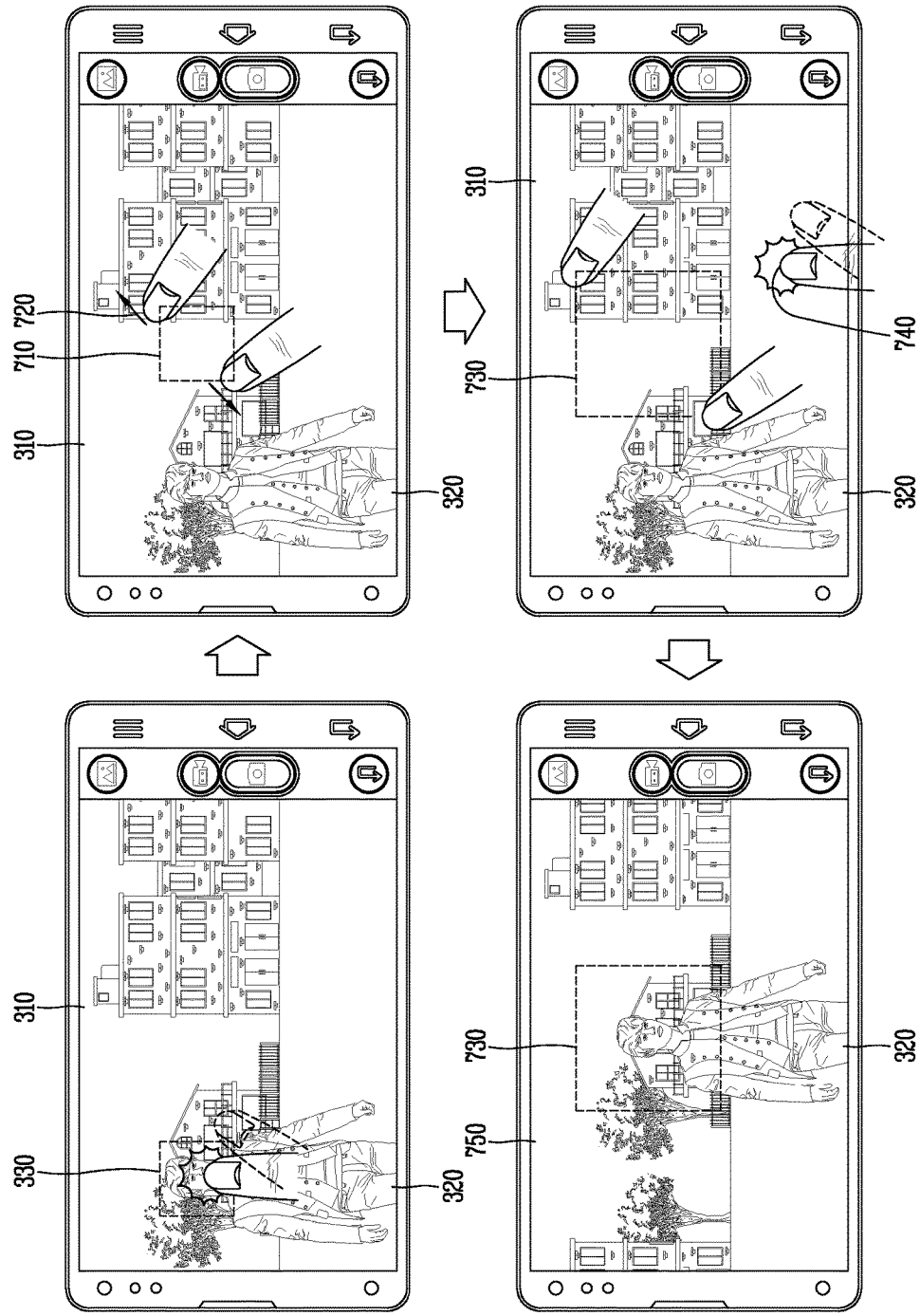
FIG. 7 is a conceptual diagram illustrating an exemplary embodiment in which a tracking object is continuously output in a specified area.

FIG. 7 is a conceptual diagram illustrating an exemplary embodiment in which a tracking object is continuously output in a specified area.

Referring to FIG. 7, as illustrated in FIG. 3, a preset touch input may be applied to a specific person 320 in a (preview) image 310 photographed in a camera photographing mode. Therefore, an area 330 for displaying that the person 320 has been selected may be arbitrarily displayed.

As an exemplary embodiment, a quadrangular area 330 that includes the person 320 and has an edge indicated by a dotted line may be output. As another exemplary embodiment, the area including the person 320 may be output in various shapes, and a flickering image effect may be output at the edge of the area 330.

If a preset touch input is again applied to the person 320, an object for setting an area in which a specific object of which movement is tracked in an image frame is to be output may be output.

As an exemplary embodiment, the touch input applied to the person 320 may be set in various manners such as a long touch, a double touch, and a force touch. Specifically, if a double touch input is applied to the person 320, an area 710 for setting an area in which a specific object of which movement is tracked is to be output may be output.

The area 710 may be output with various sizes in various shapes including a circle, a square, a rectangle, and the like. In addition, the position, shape, size, etc. of the area may be changed by applying a preset user input to the initially output area 710.

As an exemplary embodiment, by applying a drag input to a desired point, the position of the area 710 in which the person 320 is to be output may be changed to the corresponding point. Alternatively, by applying a pinch-in or pinch-out input, the size of the area 710 may be decreased or increased.

As illustrated in FIG. 7, if a pinch-out input 720 is applied to the area 710, an area 730 having an increased size may be output based on a degree to which the pinch-out input 720 is applied. After that, if a double tap (touch) input 740 is applied, the area 730 may be confirmed.

As a result, an image 750 in which the person 320 is output in the area 730 may be continuously output. As an exemplary embodiment, when the person 320 moves to be output out of the area 730, a photographing direction or viewing angle may be changed such that the person 320 is output in the area 730.

As another exemplary embodiment, when the size of the person 320 output in the image is decreased to a preset degree or less, the tracking of the movement of the person 320 may be ended. As a specific example, when the person 320 in the image is displayed with a very small size as a distance between the person 320 and the camera 121 is decreased, the tracking of the movement of the person 320 may be ended.

Meanwhile, the controller 180 may store, in the memory 170, an image in which the specific object is output in one area within the image frame, and output a thumbnail in which the specific object is output, in a photo album, in one area within a thumbnail frame. That is, a thumbnail based on a specific object being tracked may be created and stored.

In addition, the controller 180, based on that a preset user input is applied to the thumbnail, may output an editing window through which the thumbnail can be edited.

Specifically, the controller 180, based on that a preset user input is applied to the editing window, may change an area within the thumbnail frame in which the specific object is output.

Figure 8:
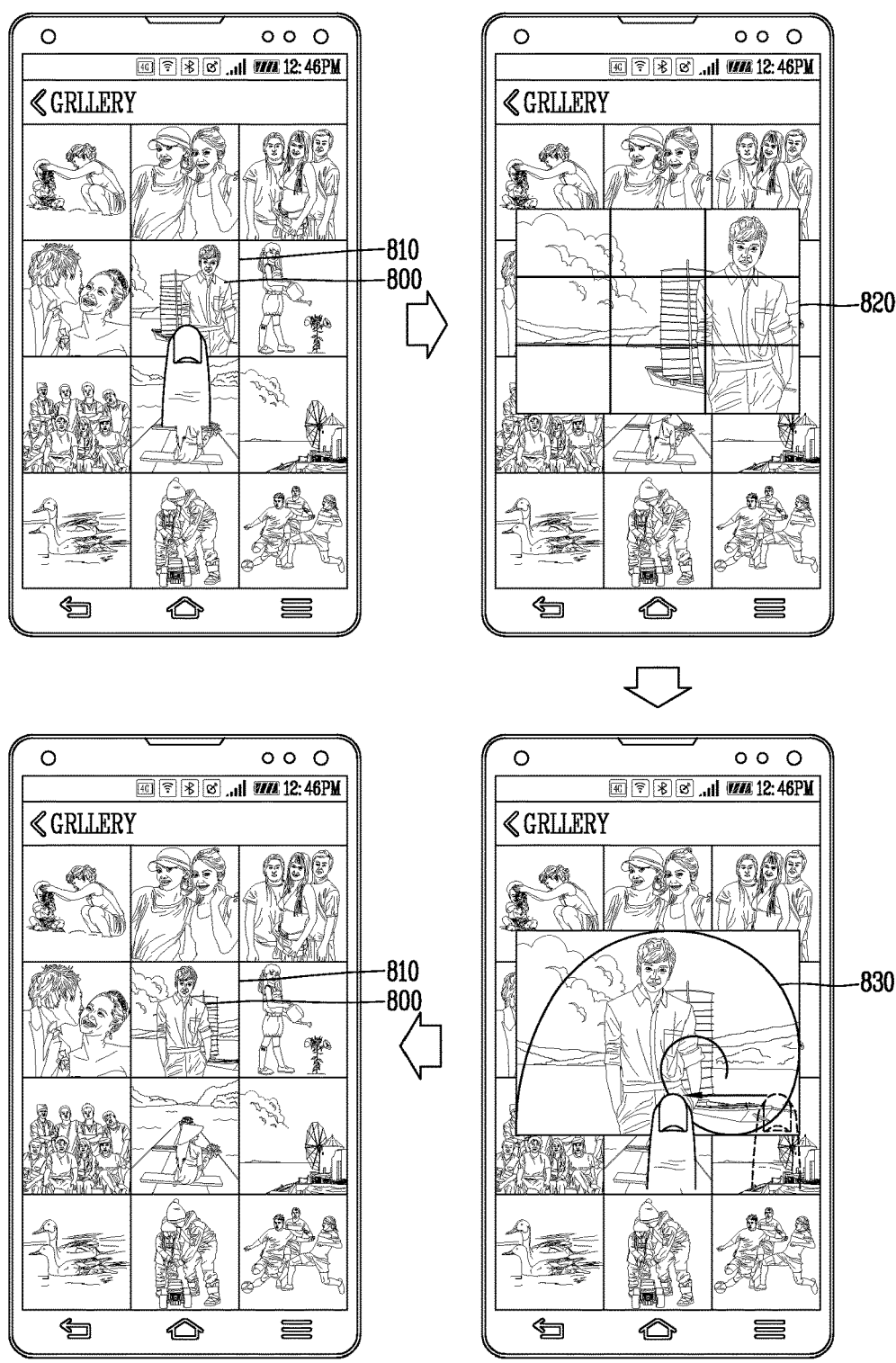
FIG. 8 is a conceptual diagram illustrating an exemplary embodiment in which the composition of a thumbnail based on a tracking object is changed.

FIG. 8 is a conceptual diagram illustrating an exemplary embodiment in which the composition of a thumbnail based on a tracking object is changed.

Referring to FIG. 8, as described above, images in which a specific object is output in one area within an image frame may be stored in the memory 170. Therefore, a thumbnail 810 corresponding to a stored image may be output in a preset photo album such that a specific object 800 of which movement is tacked is viewed in the thumbnail 810.

As an exemplary embodiment, the images may be specified by a user or may be stored in a separate folder (category) within the photo album.

As another exemplary embodiment, as illustrated in FIG. 5, the specific object 800 may be output at the middle or right side of the thumbnail 810 even when a specific object is output at the right side within the image frame to be stored.

Subsequently, if a preset touch input such as a long touch or a force touch is applied to the thumbnail 810, an editing window 820 through which a thumbnail can be edited may be output. As an exemplary embodiment, an image of the thumbnail 810, a bar for composing the image, and the like may be output on the editing window 820.

Subsequently, if a drag input is applied to the specific object 800, a guide line 830 for composition corresponding to the position of the specific object 800 may be output.

As another exemplary embodiment, when the drag input applied to the specific object 800 is out of the editing window 820, a message notifying that the drag input has been out of the editing window 820 may be output. As another exemplary embodiment, a boundary line to which a drag input for moving an object is to be applied may be output on the editing window 820.

As another exemplary embodiment, if a drag input to a middle area of the editing window 820 is applied to the specific object 800, the specific object 800 may be moved to the middle area of the editing window 820. In addition, a guide line 830 for composition, which is caused by the movement of the specific object 800, may be output.

If a preset touch input is applied to an area except the editing window 820 after composition edition is ended, a new image of which composition edition has been completed, i.e., an image in which the specific object 800 is output in the middle area, may be viewed in the thumbnail 810.

Figure 9:
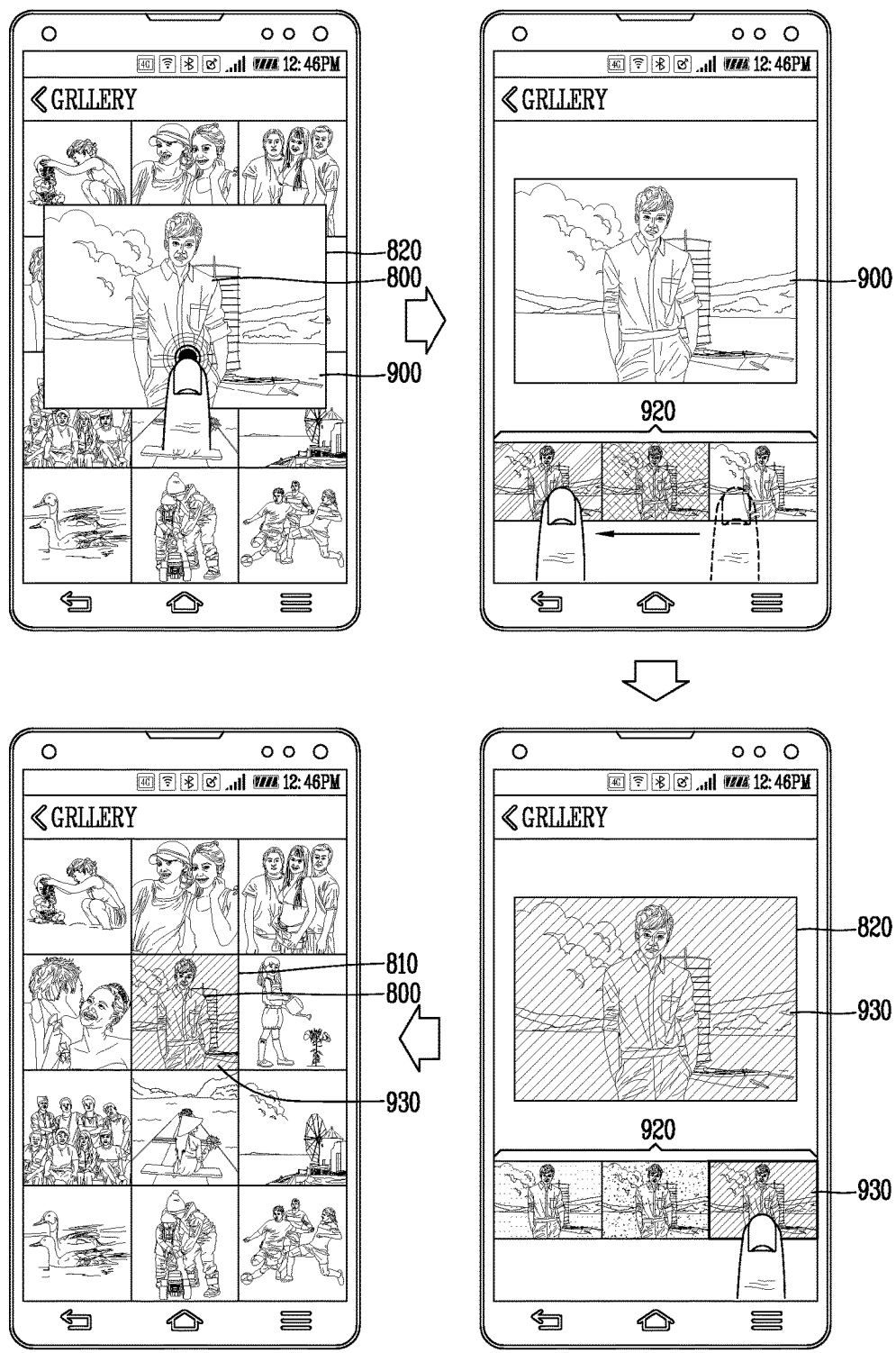
FIG. 9 is a conceptual diagram illustrating an exemplary embodiment in which a specific effect is applied to a thumbnail based on a tracking object.

FIG. 9 is a conceptual diagram illustrating an exemplary embodiment in which a specific effect is applied to a thumbnail based on a tracking object.

Referring to FIG. 9, if a preset touch input such as a long touch or a force touch is applied to the editing window 820 after the composition edition is completed as illustrated in FIG. 8, preview images 920 obtained by applying specific effects to an image 900 of the thumbnail 810 may be output.

As an exemplary embodiment, preview images 920 to which various filters including black and white, gray, sketch, blurriness, brightness, lomo, reversal, and the like are applied may be output. In addition, the preview images to which various filters are applied may be searched by applying a drag input to the left/right.

If a preset touch input is applied to a preview image 920 to which a black and white effect is applied, an image 930 obtained by applying the black and white effect to the image 900 of the thumbnail 810 may be output on the editing window 820.

After that, if a preset touch input such as a long touch or a force touch is again applied to the editing window 820, the preview images 920 disappear. If a preset touch input is again applied to an area except the editing window 820, an image 930 to which the composition edition and the black and white effect are applied may be output in the thumbnail 810. Specifically, the specific object 800 may be output in a middle area within the thumbnail 810, and the image 930 to which the black and white effect is applied may be viewed.

As an exemplary embodiment, a selected effect may also be applied to an image obtained by tracking a specific object, which corresponds to the thumbnail 810 to which a specific effect is applied. As another exemplary embodiment, a tracking image corresponding to a thumbnail to which a specific effect is applied may be separately stored.

Meanwhile, the controller 180, based on that a user input for selecting a plurality of objects in the image and then photographing a moving image is applied, may output a moving image in which each of the plurality of objects is photographed by dividing the area of the display unit 151.

Figure 10:
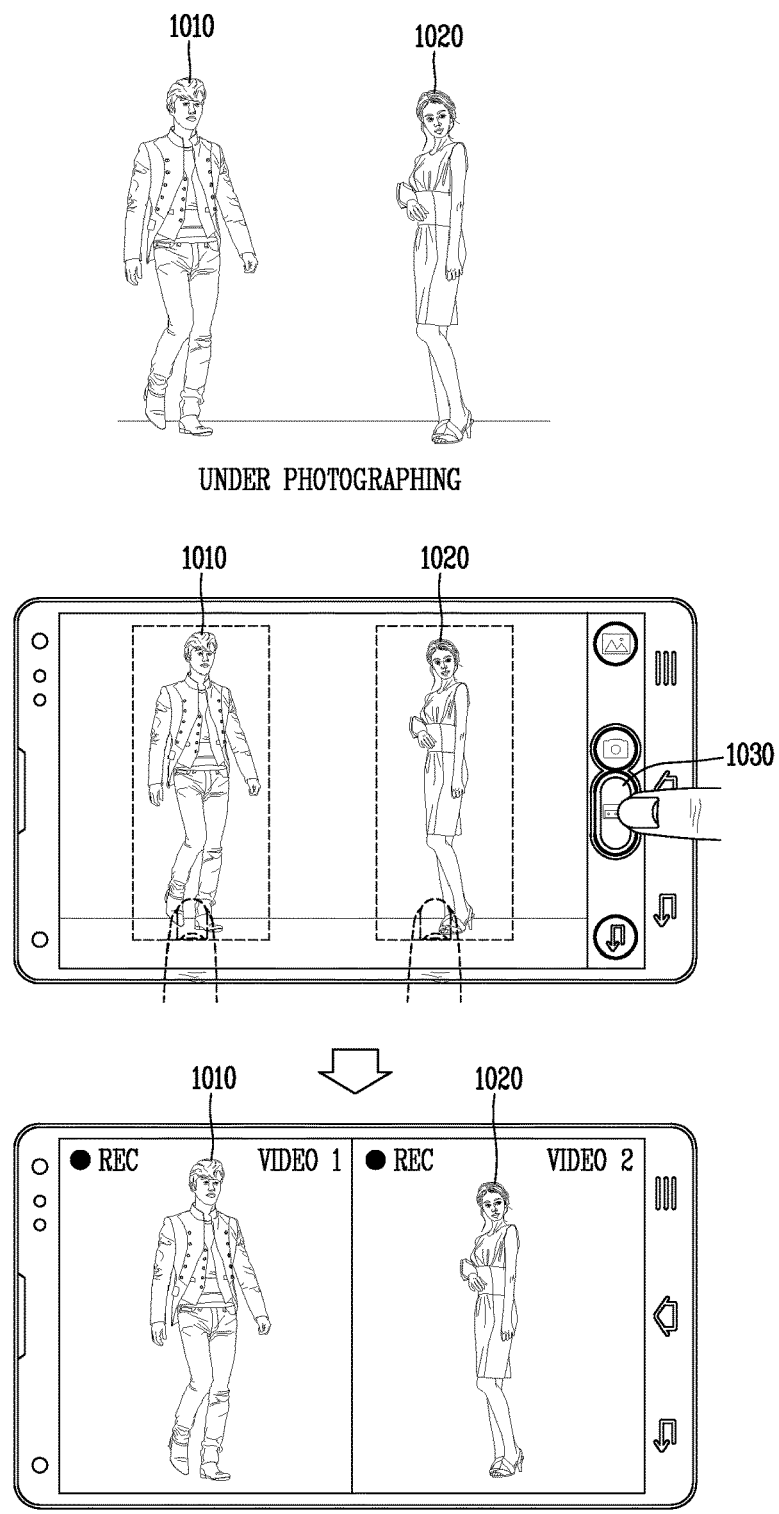
FIG. 10 is a conceptual view illustrating an exemplary embodiment in which moving images obtained by respectively tracking a plurality of objects are output on divided screens.

FIG. 10 is a conceptual view illustrating an exemplary embodiment in which moving images obtained by respectively tracking a plurality of objects are output on divided screens.

Referring to FIG. 10, a preset touch input may be applied to a first object 1010 and a second object 1020 in a (preview) image photographed in a camera photographing mode.

Therefore, an area displaying that the first object 1010 and the second object 1020 have been selected may be arbitrarily output. As an exemplary embodiment, a quadrangular area that includes each of the first object 1010 and the second object 1020 and has an edge indicated by a dotted line may be output. As another exemplary embodiment, the area including each of the first object 1010 and the second object 1020 may be output in various shapes, and a flickering image effect may be output at the edge of the area.

Subsequently, if a preset touch input is applied to a moving image photographing icon 1030, a first moving image in which the first object 1010 is photographed and a second moving image in which the second object 1020 is photographed may be respectively output in areas obtained by dividing the display unit 151.

As an exemplary embodiment, the first moving image and the second moving image may be respectively output in areas obtained by equally dividing a screen of the display unit 151.

As another exemplary embodiment, the first moving image and the second moving image may be respectively output as moving images obtained by zooming in the first object 1010 and the second object 1020.

As another exemplary embodiment, the screen of the display unit 151 may be divided in different sizes, according to distances between the camera 121 and the objects 1010 and 1020. For example, when the first object 1010 is output larger than the second object 1020 as a distance between the camera 121 and the first object 1010 is closer than that between the camera 121 and the second object 1020, the screen of the display unit 151 may be divided such that the first moving image is output in a wider area than the second moving image.

Meanwhile, the controller 180, based on that a distance between a plurality of objects in the moving image is decreased to a preset distance or less, may output a moving image in which the plurality of objects are photographed together in one area of the display unit 151.

FIG. 11 is a conceptual diagram illustrating an exemplary embodiment in which, as a distance between the plurality of objects of FIG. 10 is decreased, a moving image in which the plurality of objects are tracked together is output on the entire screen.

As an exemplary embodiment continued to FIG. 10, referring to FIG. 11, when a distance between the first object 1010 and the second object 1020 is decreased to a preset degree or less during photographing of a moving image, photographing of a third moving image in which the first object 1010 and the second object 1020 are photographed together may be started.

Specifically, when the distance between the first object 1010 and the second object 1020 is decreased to the preset degree or less, the outputting of the first moving image and the second moving image is ended, and a third moving image in which the first object 1010 and the second object 1020 are photographed together may be output on the entire screen of the display unit 151. At this time, the third moving image may be output as a moving image obtained by simultaneously zooming in the first object 1010 and the second object 1020.

Even in this case, the photographing of the first moving image and the second moving image may be continued. That is, the first moving image in which the first object 1010 is photographed, the second moving image in which the second object 1020 is photographed, and the third moving image in which the first object 1010 and the second object 1020 are photographed together may be simultaneously photographed.

Meanwhile, the controller 180, based on that a distance between the plurality of objects in the moving image is increased to a preset distance or more, may again output a moving image in which each of the plurality of objects is photographed by dividing the area of the display unit 151.

FIG. 12 is a conceptual diagram illustrating an exemplary embodiment in which, as a distance between the plurality of objects of FIG. 11 is again increased, moving images in which the respective objects are tacked are again output on divided screens.

As an exemplary embodiment continued to FIG. 11, referring to FIG. 12, when the distance between the first object 1010 and the second object 1020 is again increased to the preset degree or more during the photographing of the moving image, the first moving image in which the first object 1010 is photographed and the second moving image in which the second object 10120 is photographed may be again output in the respective areas obtained by dividing the display unit 151. At this time, the photographing of the third moving image in which the first object 1010 and the second object 1020 are photographed together may be ended.

As described in FIG. 10, the first moving image and the second moving image may be output in the respective areas obtained by equally dividing the screen of the display unit 151. In addition, the first moving image and the second moving image may be respectively output as moving images obtained by zooming in the first object 1010 and the second object 1020.

As another exemplary embodiment, the screen of the display unit 151 may be divided in different sizes, according to distances between the camera 121 and the objects 1010 and 1020. For example, when the first object 1010 is output larger than the second object 1020 as a distance between the camera 121 and the first object 1010 is closer than that between the camera 121 and the second object 1020, the screen of the display unit 151 may be divided such that the first moving image is output in a wider area than the second moving image.

Meanwhile, the controller 180, based on that a user input for selecting a plurality of objects in the image and then photographing a moving image is applied, may output a moving image in which the plurality of objects are photographed together in one area of the display unit 151, and, based on that a distance between the plurality of objects in the moving image is decreased to a preset distance or less or is increased to a preset distance or more, may photograph and output the moving image using the zoom-in or zoom-out technique of a preset degree.

Figure 13:
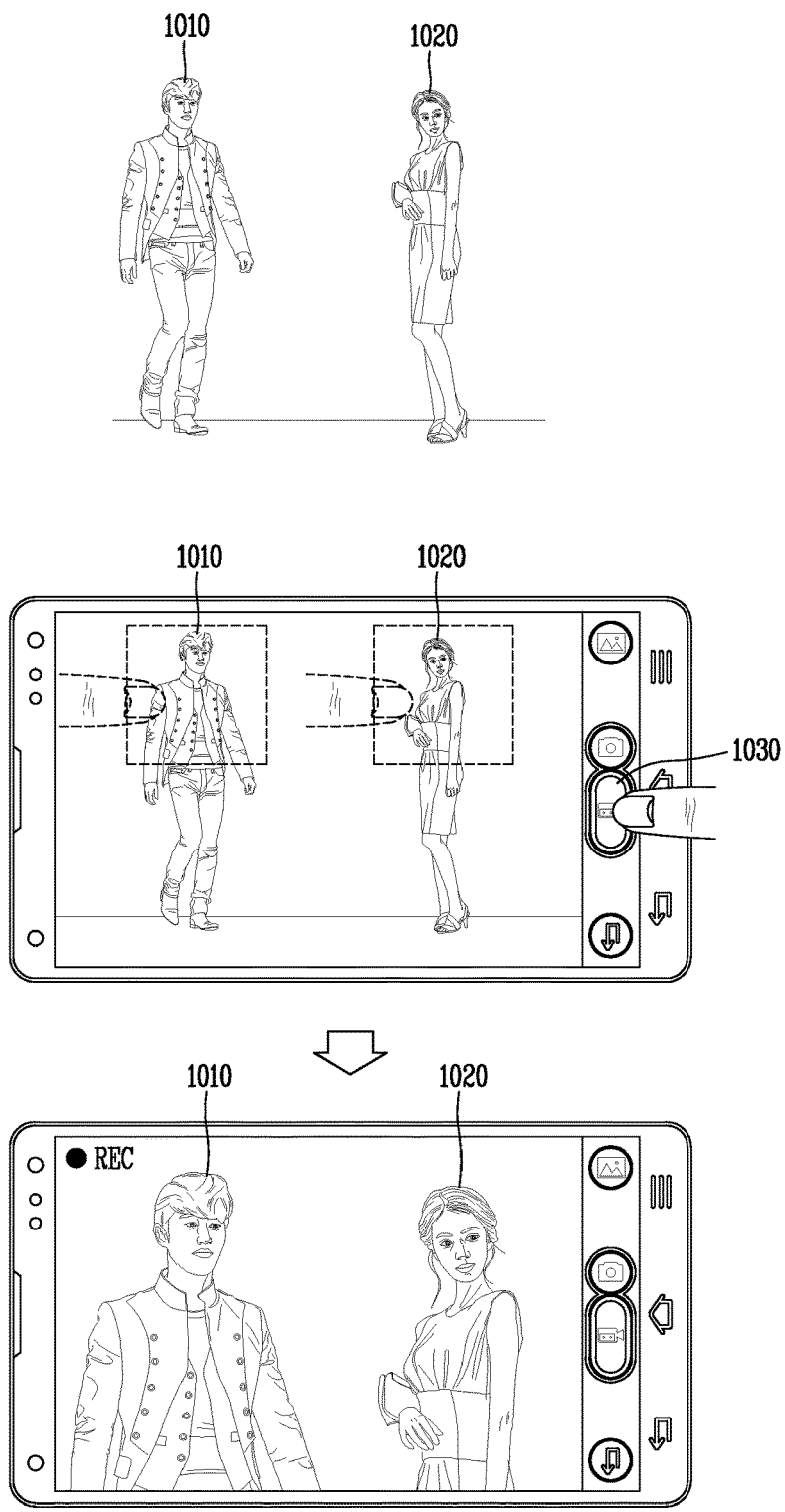
FIG. 13 is a conceptual diagram illustrating an exemplary embodiment in which a moving image in which a plurality of objects are tracked together is photographed.

FIG. 13 is a conceptual diagram illustrating an exemplary embodiment in which a moving image in which a plurality of objects are tracked together is photographed.

Referring to FIG. 13, a preset touch input may be applied to a first object 1010 and a second object 1020 in a (preview) image photographed in a camera photographing mode.

Therefore, an area displaying that the first object 1010 and the second object 1020 have been selected may be arbitrarily output. As an exemplary embodiment, a quadrangular area that includes each of the first object 1010 and the second object 1020 and has an edge indicated by a dotted line may be output. As another exemplary embodiment, the area including each of the first object 1010 and the second object 1020 may be output in various shapes, and a flickering image effect may be output at the edge of the area.

Subsequently, if a preset touch input is applied to a moving image photographing icon 1030, a moving image in which the first object 1010 and the second object 1020 are photographed together may be output. At this time, the photographed moving image may be output as a moving image obtained by simultaneously zooming in the first object 1010 and the second object 1020.

As an exemplary embodiment, if a preset touch input is applied to the moving image photographing icon 1030, when the first object 1010 and the second object 1020 output in an image have sizes similar to each other, and a distance between the first object 1010 and the second object 1020 is within a distance of a preset degree or less, a moving image in which the first object 1010 and the second object 1020 are photographed together may be output.

Figure 14:
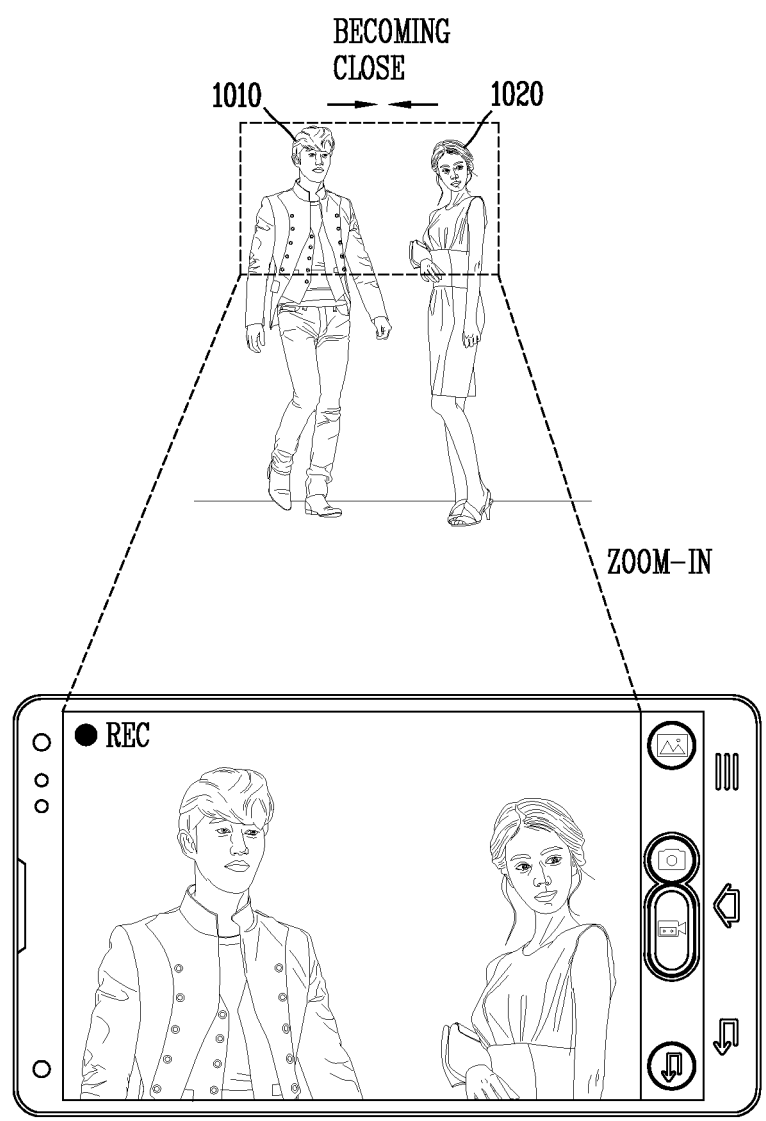

FIG. 14 is a conceptual diagram illustrating an exemplary embodiment in which, as a distance between the plurality of objects of FIG. 13 is decreased, a moving image is photographed by automatically performing zoom-in.

As an exemplary embodiment continued to FIG. 13, referring to FIG. 14, when a distance between the first object 1010 and the second object 1020 is decreased to a preset degree or less during photographing of a moving image, the zoom-in may be automatically performed to the preset degree according to the distance between the first object 1010 and the second object 1020.

As an exemplary embodiment, as the distance between the first object 1010 and the second object 1020 is decreased, the degree to which the zoom-in is performed may be increased. At this time, the zoom-in may be performed such that the first object 1010 and the second object 1020 are fully filled in an image frame.

Figure 15:
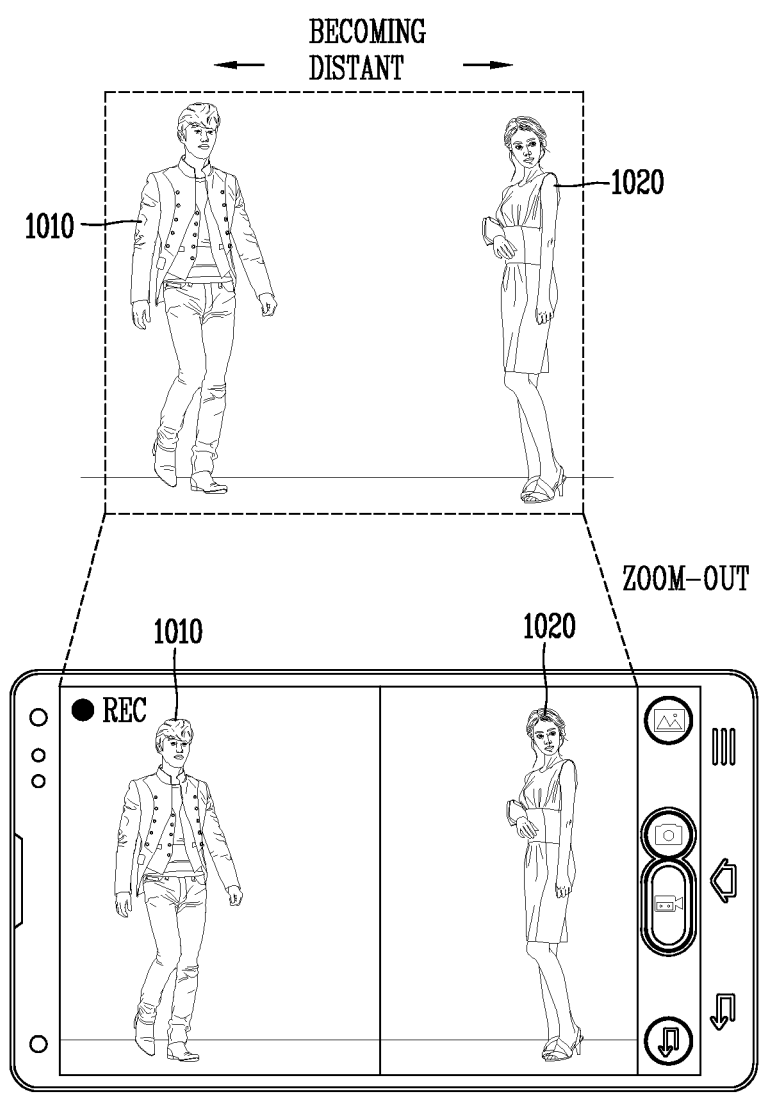
FIG. 15 is a conceptual diagram illustrating an exemplary embodiment in which, as a distance between the plurality of objects of FIG. 14 is increased, a moving image is photographed by automatically performing zoom-out.

FIG. 15 is a conceptual diagram illustrating an exemplary embodiment in which, as a distance between the plurality of objects of FIG. 14 is increased, a moving image is photographed by automatically performing zoom-out.

As an exemplary embodiment continued to FIG. 14, referring to FIG. 15, when the distance between the first object 1010 and the second object 1020 is increased to the preset degree or more during the photographing of the moving image, the zoom-out may be automatically performed to the preset degree according to the distance between the first object 1010 and the second object 1020.

As an exemplary embodiment, as the distance between the first object 1010 and the second object 1020 is increased, the degree to which the zoom-out is performed may be increased. At this time, the zoom-out may be performed such that the first object 1010 and the second object 1020 are output together in an image frame.

Meanwhile, the controller 180, based on that the plurality of objects in the moving image are output with a size difference of a preset degree or more, may photographed and output the moving image using the zoom-out technique of a preset degree.

Figure 16:
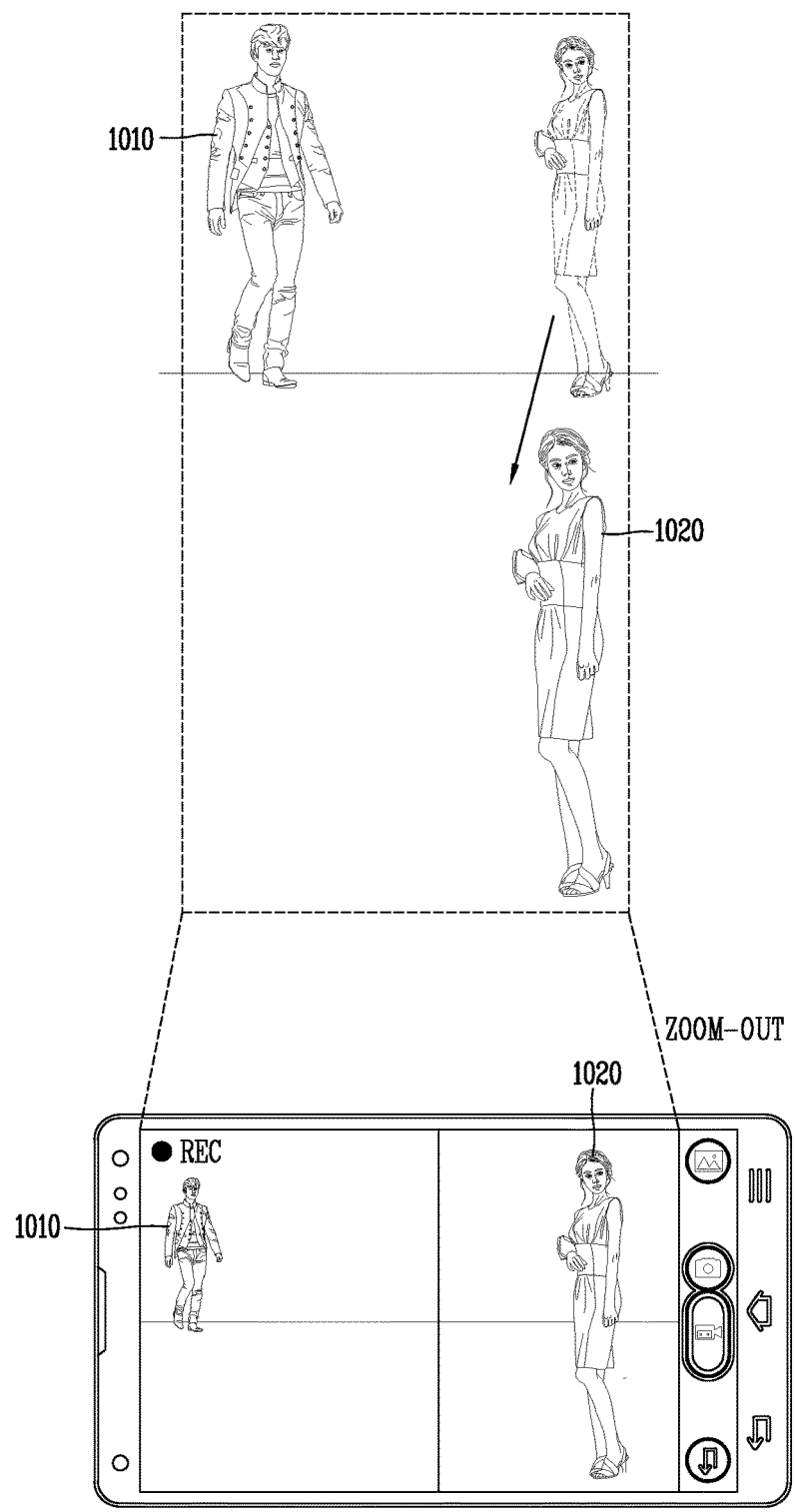
FIG. 16 is a conceptual diagram illustrating an exemplary embodiment in which, as the size of at least one of the plurality of objects of FIG. 13 is increased, a moving image is photographed by automatically performing zoom-out.

FIG. 16 is a conceptual diagram illustrating an exemplary embodiment in which, as the size of at least one of the plurality of objects of FIG. 13 is increased, a moving image is photographed by automatically performing zoom-out.

As an exemplary embodiment continued to FIG. 13, referring to FIG. 16, when a difference in size between the first object 1010 and the second object 1020, which are output in the moving image, is equal to or greater than a preset degree as the distance between the camera 121 and the second object 1020 is gradually decreased during the photographing of the moving image, the zoom-out may be automatically performed to the preset degree according to the sizes of the first object 1010 and the second object 1020 in the moving image.

As an exemplary embodiment, as the difference in size between the first object 1010 and the second object 1020, which are output in the moving image, is increased due to an increase in distance between the first object 1010 and the second object 1020, the degree to which the zoom-out is performed may be increased. At this time, the zoom-out may be performed such that the first object 1010 and the second object 1020 are output together in an image frame.

Meanwhile, the controller 180, based on that the plurality of objects in the moving image are output with a size difference of a preset degree or more, may output a moving image in which each of the plurality of objects is photographed by dividing the area of the display unit 151.

FIG. 17 is a conceptual diagram illustrating an exemplary embodiment in which, as the size of at least one of the plurality of objects of FIG. 13 is decreased, a moving image is photographed by automatically performing zoom-in.

As an exemplary embodiment continued to FIG. 13, referring to FIG. 17, when a difference in size between the first object 1010 and the second object 1020, which are output in the moving image, is equal to or greater than a preset degree as the distance between the camera 121 and the second object 1020 is gradually increased during the photographing of the moving image, a first moving image in which the first object 1010 is photographed and a second moving image in which the second object 1020 is photographed may be respectively output in areas obtained by dividing the display unit 151.

As an exemplary embodiment, the first moving image and the second moving image may be respectively output in areas obtained by dividing a screen of the display unit 151.

As another exemplary embodiment, the first moving image and the second moving image may be respectively output as moving images obtained by performing zoom-in on the first object 1010 and the second object 1020.

As another exemplary embodiment, a screen of the display unit 151 may be divided in different sizes according to distances between the camera 121 and the objects 1010 and 1020. Specifically, when the first object 1010 is output larger than the second object 1020 as a distance between the camera 121 and the first object 1010 is closer than that between the camera 121 and the second object 1020, the screen of the display unit 151 may be divided such that the first moving image is output in a wider area than the second moving image.

Meanwhile, the controller 180, based on that a user input for selecting a specific object in the image and then photographing a moving image, may output a moving image in which the specific object is photographed in one area of the display unit 151, and, based on that another moving object is output in a preset boundary area within the moving image frame, may photograph and output the moving image using the zoom-out technique of a preset degree.

FIG. 18 is a conceptual diagram illustrating an exemplary embodiment in which a moving image in which a specific object is tracked is photographed.

Referring to FIG. 18, like the above-described exemplary embodiments, a preset touch input may be applied to a first object 1010 in a (preview) image photographed in a camera photographing mode.

Therefore, an area displaying that the first object 1010 has been selected may be arbitrarily output. As an exemplary embodiment, a quadrangular area that includes the first object 1010 and has an edge indicated by a dotted line may be output. As another exemplary embodiment, the area including the first object 1010 may be output in various shapes, and a flickering image effect may be output at the edge of the area.

Subsequently, if a preset touch input is applied to a moving image photographing icon 1030, a moving image in which only the first object 1010 is photographed may be output. At this time, a moving image obtained by performing zoom-in may be output such that the first object 1010 is fully filled in an image frame.

FIG. 19 is a conceptual diagram illustrating an exemplary embodiment in which, when another moving object is detected during the photographing of FIG. 18, a moving image is photographed by automatically performing zoom-out.

As an exemplary embodiment continued to FIG. 18, referring to FIG. 19, when a portion of a second object 1020 starts being viewed in an image frame as a distance between the first object 1010 and the second object 1020 is decreased during the photographing of the moving image, the zoom-out may be automatically performed to a preset degree.

As an exemplary embodiment, the zoom-out may be automatically performed to a degree to which the first object 1010 and the second object 1020 are viewed together in the image frame.

Meanwhile, the controller 180, based on that, after the specific object is partially or entirely covered by the another object in the moving image, the specific object is not again output within a preset time, may end the photographing of the moving image, and, based on that the specific object is again output within the preset time, may output a moving image in which only the specific object is photographed using the zoom-in technique of a preset degree.

Figure 20:
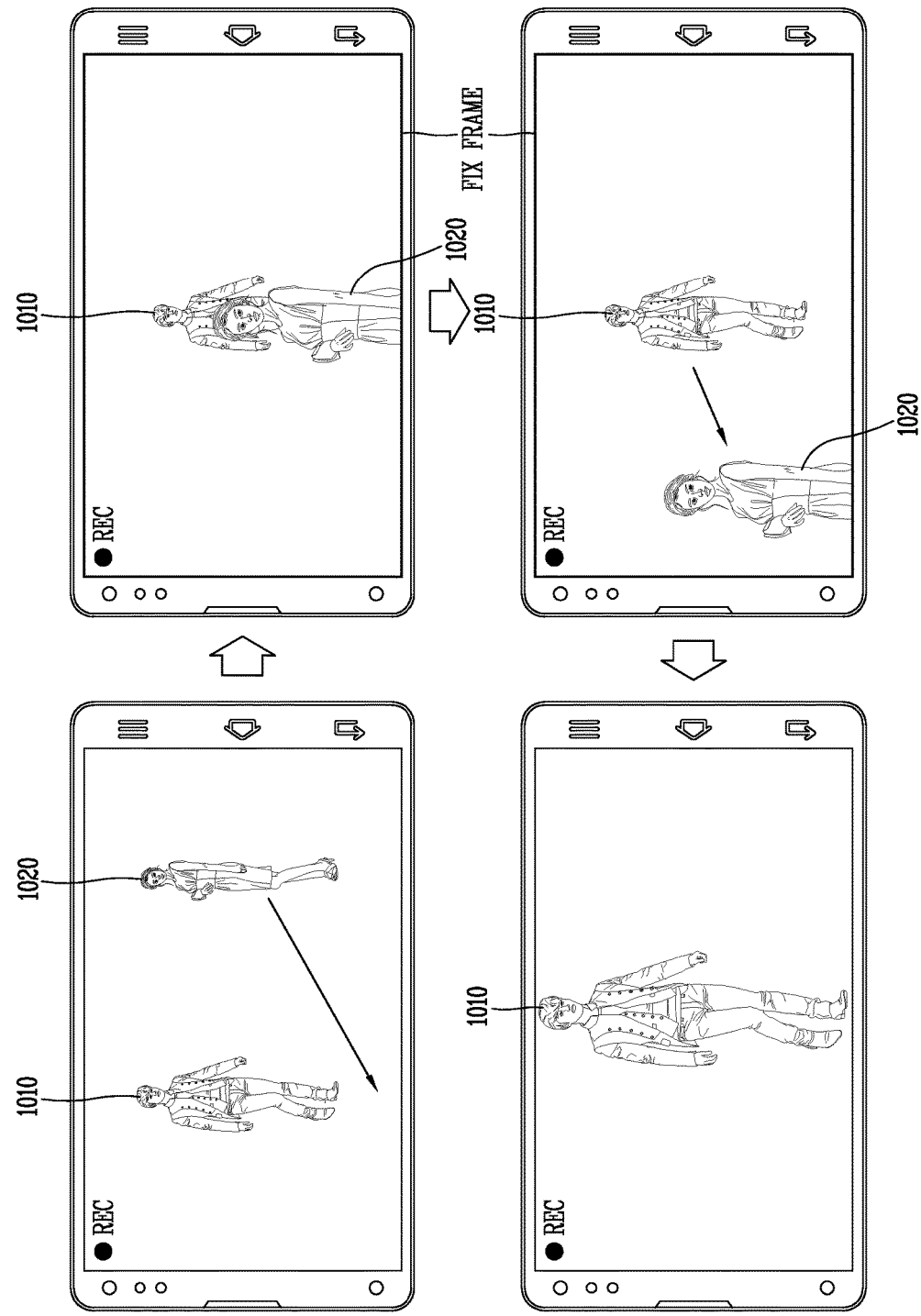
FIG. 20 is a conceptual diagram illustrating an exemplary embodiment related to a case where another object covers a specific object during the photographing of FIG. 19.

FIG. 20 is a conceptual diagram illustrating an exemplary embodiment related to a case where another object covers a specific object during the photographing of FIG. 19.

As an exemplary embodiment continued to FIG. 19, referring to FIG. 20, the first object 1010 may be partially or entirely covered as the second object 1020 moves during the photographing of the moving image.

As an exemplary embodiment, when the first object 1010 specified such that its movement is tacked is completely covered by the another moving object 1020, the center of an image frame may be fixed in area (position) in which the first object 1010 is output before the first object 1010 is completely covered.

After that, when the first object 1010 is not again viewed within a preset time, the photographing of the moving image may be automatically ended.

As another example, when the first object 1010 is again viewed within the preset time, a moving image obtained by performing the zoom-in such that only the first object 1010 is displayed on the entire screen of the display unit 151 may be output.

Meanwhile, the controller 180, based on that a user input for selecting a plurality of objects in a moving image and then photographing an image is applied during photographing of the moving image, may store, in the memory 170, an image in which the plurality of objects are photographed together or an image in which each of the plurality of objects is photographed, according to a distance between the plurality of objects.

Figure 21:
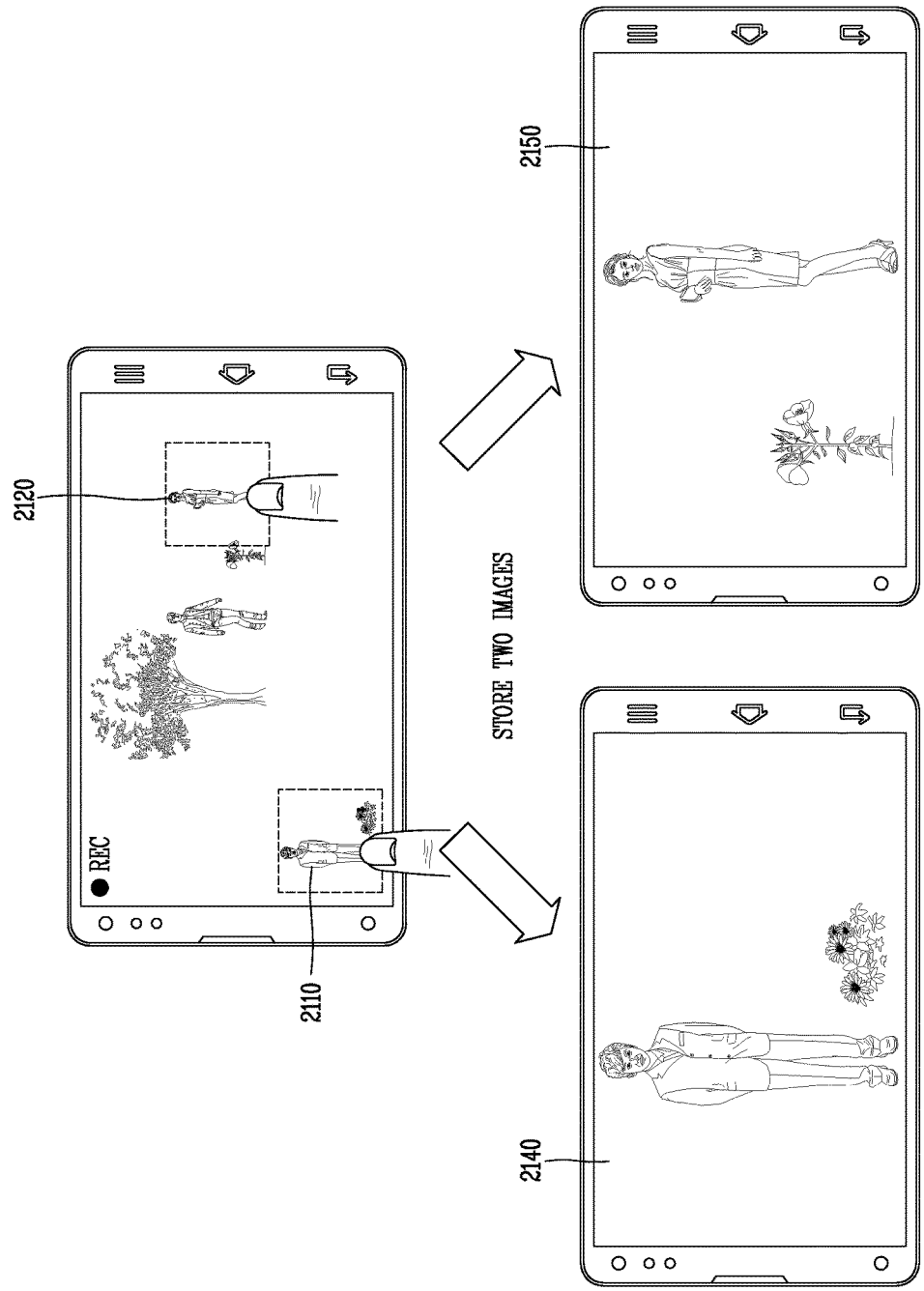
FIG. 21 is a conceptual diagram illustrating an exemplary embodiment in which an image is stored for each object selected during photographing of a moving image.

FIG. 21 is a conceptual diagram illustrating an exemplary embodiment in which an image is stored for each object selected during photographing of a moving image.

Referring to FIG. 21, if a preset touch input is applied to each of a first object 2110 and a second object 2120 during photographing of a moving image, an area displaying that the first object 2110 and the second object 2120 have been selected may be arbitrarily output.

As an exemplary embodiment, a quadrangular area that includes each of the first object 2110 and the second object 2120 and has an edge indicated by a dotted line may be output. As another exemplary embodiment, the area including each of the first object 2110 and the second object 2120 may be output in various shapes, and a flickering image effect may be output at the edge of the area.

Subsequently, a user input for separately storing an image may be applied during the photographing of the moving image. As an exemplary embodiment, a preset touch input may be applied to an icon capable of storing an image during the photographing of the moving image. Alternatively, an input for pressing a button capable of storing an image may be applied during the photographing of the moving image. As another exemplary embodiment, a preset touch input may be applied to a screen of the display unit 151.

As a result, when a distance between the first object 2110 and the second object 2120, which are output in the moving image, is equal to or greater than a preset distance, a first image 2140 based on the first object 2110 and a second image 2150 based on the second object 2120 may be individually stored in the memory 170.

As an exemplary embodiment, the first image 2140 and the second image 2150 may be respectively images in which the first object 2110 and the second object 2120 are output in the middle of image frames.

As another exemplary embodiment, the first image 2140 and the second image 2150 may be stored in a separate folder within a photo album.

As another exemplary embodiment, the first image 2140 and the second image 2150 may be respectively images captured such that the first object 2110 and the second object 2120 are output with preset sizes.

FIG. 22 is a conceptual diagram illustrating an exemplary embodiment in which an image including a selected object is stored during photographing of a moving image.

As an exemplary embodiment continued to FIG. 21, referring to FIG. 22, if a preset touch input is applied to each of the second object 2120 and a third object 2130 during the photographing of the moving image, an area displaying that the second object 2120 and the third object 2130 have been selected may be arbitrarily output.

As an exemplary embodiment, a quadrangular area that includes each of the second object 2120 and the third object 2130 and has an edge indicated by a dotted line may be output. As another exemplary embodiment, the area including each of the second object 2120 and the third object 2130 may be output in various shapes, and a flickering image effect may be output at the edge of the area.

Subsequently, a user input for separately storing an image may be applied during the photographing of the moving image. As an exemplary embodiment, a preset touch input may be applied to an icon capable of storing an image during the photographing of the moving image. Alternatively, an input for pressing a button capable of storing image may be applied during the photographing of the moving image. As another exemplary embodiment, a preset touch input may be applied to a screen of the display unit 151.

As a result, when a distance between the second object 2120 and the third object 2130, which are output in the moving image, is within a preset distance, one image 2200 based on the second object 2120 and the third object 2130 may be stored in the memory 170.

As an exemplary embodiment, the image 2200 may be an image in which the second object 2120 and the third object 2130 are output in the middle of an image frame.

As another exemplary embodiment, the image 2200 may be stored in a separate folder within a photo album.

As another exemplary embodiment, the image 2200 may be an image captured such that the second object 2120 and the third object 2130 are output with preset sizes.

Meanwhile, the controller 180, based on that, during photographing of a moving image in which a plurality of objects are selected, a distance between the plurality of objects is decreased to a preset distance or less, may store, in the memory 170, the plurality of objects at a preset photographing time interval.

Figure 23:
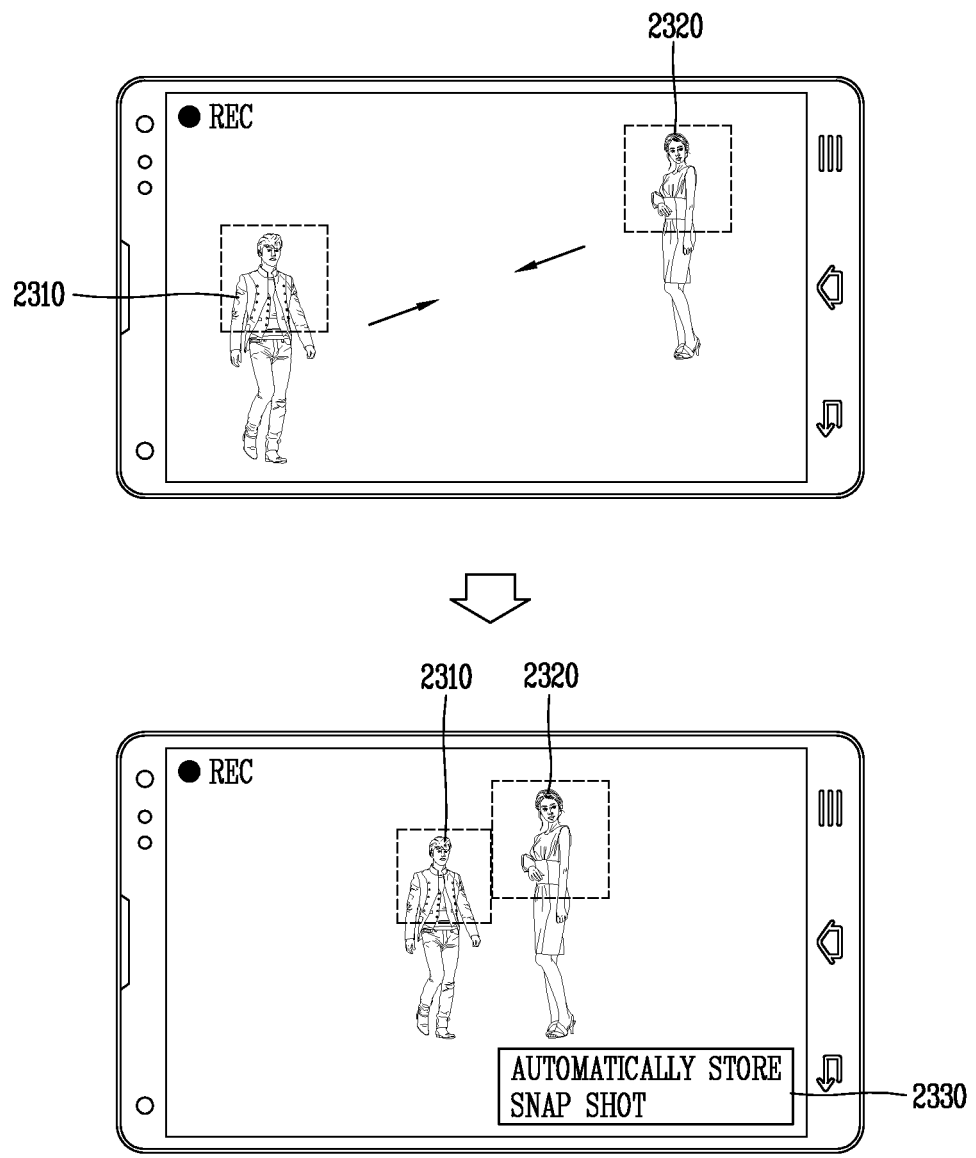
FIG. 23 is a conceptual diagram illustrating an exemplary embodiment in which, as a distance between selected objects is decreased during photographing of a moving image, an image including the selected objects is automatically stored.

FIG. 23 is a conceptual diagram illustrating an exemplary embodiment in which, as a distance between selected objects is decreased during photographing of a moving image, an image including the selected objects is automatically stored.

Referring to FIG. 23, when a distance between a first object 2310 and a second object 2320, which are selected during photographing of a moving image, is decreased to a preset distance or less, an image based on the first object 2310 and the second object 2320 may be automatically stored.

As exemplary embodiment, as the distance between the first object 2310 and the second object 2320 is decreased, a photographing time interval at which the image based on the first object 2310 and the second object 2320 is photographed may be shortened.

That is, as the distance between the first object 2310 and the second object 2320 is decreased, a larger number of images based on the first object 2310 and the second object 2320 may be stored (created).

As another exemplary embodiment, an icon 2330 notifying that an image has been automatically stored may be output. In addition, if a preset touch input is applied to the icon 2330, the screen of the display unit 151 may be changed to a separate folder in which the images are stored.

As another exemplary embodiment, when a sound having an intensity of a preset degree or more is detected from the outside during the photographing of the moving image, the image based on the first object 2310 and the second object 2320 may be automatically stored.

As another exemplary embodiment, the image based on the first object 2310 and the second object 2320 may be automatically stored at a short time interval for a certain time after the sound is turned on.

As another exemplary embodiment, the image based on the first object 2310 and the second object 2320 may be automatically stored at a short time interval until the intensity of the sound is again decreased after the sound is turned on.

As another exemplary embodiment, the direction of a sound input from the outside may be considered. That is, when a sound having an intensity of a preset degree or more is detected from a direction in which the first object 2310 and the second object 2320 exist, the image based on the first object 2310 and the second object 2320 may be automatically stored.

As another exemplary embodiment, when the size of a specific object selected during the photographing of the moving image is gradually increased, an image based on the specific object may be automatically stored.

The mobile terminal and the method for controlling the same according to the present disclosure have advantages as follows.

According to at least one of the exemplary embodiments, a moving subject is continuously output in one area within an image frame, so that movement of the subject can be effectively tracked.

According to at least one of the exemplary embodiments, movement of a specific object can be realistically implemented by an image having a viewing angle of 360 degrees.

According to at least one of the exemplary embodiments, a specific object of which movement is tracked is previewed in a thumbnail image of a photo album, so that an image in which movement of the specific object is tracked can be easily searched. In addition, as the thumbnail is edited, the image in which the movement of the specific object is tracked can be rapidly and simply edited.

According to at least one of the exemplary embodiments, a moving image or an image can be photographed, or the zoom-in or zoom-out technique can be applied, according to a distance between a plurality of objects in a moving image, a difference in size between the objects, etc. As a result, movement of a specific object can be more effectively tracked.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a first camera;
a display; and
a controller configured to:
cause the display to display an image captured by the first camera within a view frame;
control the first camera to track a specific object present in the image in response to user selection of the specific object;
cause the display to display the specific object in one area, among a plurality of areas, within the view frame according to the tracking of the specific object;
cause the display to display a plurality of indicators, wherein each indicator is associated with one of the plurality of areas within the view frame;
cause the display to display the specific object in an area within the view frame that is associated with a first indicator of the plurality of indicators in response to user selection of the first indicator; and
cause the display to display a preset image effect with regard to the specific object in response to user selection of the first indicator.

2. The mobile terminal of claim 1, further comprising:
a second camera, wherein the controller is further configured to:
control the second camera to track the specific object when the specific object is displayed within a boundary area of the view frame of the first camera.

3. The mobile terminal of claim 1, wherein the controller is further configured to:
control the first camera to stop the tracking of the specific object when a size of the specific object relative to the view frame is less than a defined size.

4. The mobile terminal of claim 1, wherein the controller is further configured to:
cause the display to display the specific object in a second area, among the plurality of areas, within the view frame in response to a touch-drag input received at the specific object, wherein the second area is area where the touch-drag input ends.

5. The mobile terminal of claim 1, wherein the controller is further configured to:
cause the display to display the specific object in a second area, among the plurality of area, within the view frame in response to user input received at the second area.

6. The mobile terminal of claim 1, further comprising:
a memory, and
wherein the controller is further configured to:
store, in the memory, an image in which the specific object is located within an area that corresponds to the one area of the view frame; and
cause the display to display a thumbnail of the stored image in a photo album.

7. The mobile terminal of claim 6, wherein the controller is further configured to:

cause the display to display an editing window, in response to a user input with regard to the thumbnail, wherein the editing window permits editing of the thumbnail.

8. The mobile terminal of claim 7, wherein the controller is further configured to:
change an area within the thumbnail within which the specific object is included according to an input received via the editing window.

9. The mobile terminal of claim 1, wherein the controller is further configured to:
control the first camera to obtain a moving image captured by the first camera that includes a plurality of objects identified via user selection; and
cause the display to display a separate moving image for each of the plurality of objects in a separate area of the display.

10. The mobile terminal of claim 9, wherein the controller is further configured to:
cause the display to display a single moving image that includes all of the plurality of objects when the plurality of objects are located less than a threshold distance between each other.

11. The mobile terminal of claim 10, wherein the controller is further configured to:
cause the display to display the separate moving image for each of the plurality of objects in the separate area of the display when the plurality of objects are located greater than a threshold distance from each other.

12. The mobile terminal of claim 1, wherein the controller is further configured to:
control the first camera to obtain a moving image that includes a plurality of objects identified via user selection;
cause the display to display the moving image as a single moving image that includes all of the plurality of objects when the plurality of objects are located less than a threshold distance between each other; and
apply a zoom-in technique to the single moving image so that the plurality of objects continue to be located less than the threshold distance between each other.

13. The mobile terminal of claim 12, wherein the controller is further configured to:
apply a zoom-out technique to the single moving image when a size difference between each of the plurality of objects exceeds a threshold value; and
cause the display to display the single moving image according to the zoom-out technique.

14. The mobile terminal of claim 12, wherein the controller is further configured to:
cause the display to display a single moving image that includes all of the plurality of objects when a size difference between each of the plurality of objects exceeds a threshold value.

15. The mobile terminal of claim 1, wherein the controller is further configured to:
control the first camera to obtain a moving image that includes an object identified via user selection;
control the first camera to zoom-out the moving image when a further object is identified as being located within a boundary area of the view frame; and
control the display to display the moving image according to the zoom-out technique.

16. The mobile terminal of claim 15, wherein the controller is further configured to:
control the first camera to zoom-in the moving image when the object is partially or entirely covered by the further object; and
cause the display to display the moving image according to the zoom-in technique.

17. The mobile terminal of claim 1, further comprising:
a memory, and
wherein the controller is further configured to:
control the first camera to obtain a moving image that includes a plurality of objects identified via user selection;
obtain an image from the moving image; and
store, in the memory, the image from the moving image in which the plurality of objects are located.

18. The mobile terminal of claim 1, further comprising:
a memory, and
wherein the controller is further configured to:
control the first camera to obtain a moving image that includes a plurality of objects identified via user selection;
obtain an image from the moving image when a distance between the plurality of objects is less than a threshold distance; and
store, in the memory, the image from the moving image in which the plurality of objects are located.

19. A method for controlling a mobile terminal having a display and a camera, the method comprising:
displaying, on the display, an image captured by the camera within a view frame;
controlling the camera to track a specific object present in the image in response to user selection of the specific object;
displaying, on the display, the specific object in one area, among a plurality of areas, within the view frame according to the tracking of the specific object;
displaying, on the display, a plurality of indicators, wherein each indicator is associated with one of the plurality of areas within the view frame;
displaying, on the display, the specific object in an area within the view frame that is associated with a first indicator of the plurality of indicators in response to user selection of the first indicator; and
displaying, on the display, a preset image effect with regard to the specific object in response to user selection of the first indicator.

* * * * *